US012679388B2

(12) United States Patent
Desai et al.

(10) Patent No.: US 12,679,388 B2
(45) Date of Patent: Jul. 14, 2026

(54) CONTROL BARRIER FUNCTIONS FOR SAFETY-CRITICAL CONTROL OF AUTOMOTIVE STABILITY

(71) Applicant: TOYOTA RESEARCH INSTITUTE, INC., Los Altos, CA (US)

(72) Inventors: Manavendra Balwant Desai, Detroit, MI (US); Makoto Suminaka, Los Altos, CA (US); James A. Dallas, Los Altos, CA (US); John K. Subosits, Menlo Park, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/671,418

(22) Filed: May 22, 2024

(65) Prior Publication Data

US 2025/0242817 A1     Jul. 31, 2025

Related U.S. Application Data

(60) Provisional application No. 63/627,335, filed on Jan. 31, 2024.

(51) Int. Cl.
*B60W 50/00* (2006.01)

(52) U.S. Cl.
CPC .... *B60W 50/0098* (2013.01); *B60W 50/0097* (2013.01); *B60W 2050/0031* (2013.01);
(Continued)

(58) Field of Classification Search
CPC ......... B60W 50/0098; B60W 50/0097; B60W 2050/0031; B60W 2050/0052;
(Continued)

(56) References Cited

U.S. PATENT DOCUMENTS

| | | | |
|---|---|---|---|
| 9,434,408 B2 | 9/2016 | Kojo | |
| 11,618,436 B2 | 4/2023 | Horiguchi | |

(Continued)

FOREIGN PATENT DOCUMENTS

| | | | | |
|---|---|---|---|---|
| JP | 2003274508 A | * | 9/2003 | |
| JP | 2006240400 A | | 9/2006 | |
| JP | 2008087500 A | * | 4/2008 | |

*Primary Examiner* — Isaac G Smith

(74) *Attorney, Agent, or Firm* — SHEPPARD, MULLIN, RICHTER & HAMPTON LLP; Daniel N. Yannuzzi

(57) ABSTRACT

Systems and methods are provided for operation of a vehicle to prevent the vehicle from entering unsafe driving states. In examples, a current operational state of a vehicle is determined based on sensor data collected by sensors on the vehicle. Based on the current operational state, a safety-critical threshold value for a vehicle dynamic parameter at which the vehicle is predicted to breach a limit-of-handling is determined. A command to operate the vehicle in a requested operational state is received, which includes driving inputs for operating the vehicle in the requested operational state. The command is filtered by constraining the requested operational state according to a control barrier function based on the safety-critical threshold value and a requested value of the vehicle dynamic parameter determined from the requested operational state. A control signal is generated that controls the vehicle by modifying the driving inputs based on the filtered command.

20 Claims, 5 Drawing Sheets

(52) U.S. Cl.
CPC .............. *B60W 2050/0052* (2013.01); *B60W 2510/0657* (2013.01); *B60W 2510/18* (2013.01); *B60W 2520/10* (2013.01); *B60W 2520/12* (2013.01); *B60W 2520/14* (2013.01); *B60W 2520/26* (2013.01); *B60W 2520/28* (2013.01); *B60W 2530/10* (2013.01); *B60W 2530/20* (2013.01)

(58) Field of Classification Search
CPC ..... B60W 2510/0657; B60W 2510/18; B60W 2520/10; B60W 2520/12; B60W 2520/14; B60W 2520/26; B60W 2520/28; B60W 2530/10; B60W 2530/20
USPC ......................................................... 701/27
See application file for complete search history.

(56)                    References Cited

U.S. PATENT DOCUMENTS

| | | | |
|---|---|---|---|
| 2007/0088484 A1 | 4/2007 | Fujita | |
| 2014/0303827 A1 | 10/2014 | Dolgov | |
| 2018/0347486 A1* | 12/2018 | Mahabadi | F02P 5/1504 |
| 2020/0089225 A1 | 3/2020 | Sadakiyo | |
| 2022/0194156 A1* | 6/2022 | Weston | B60G 15/068 |
| 2023/0001940 A1 | 1/2023 | Doerr | |
| 2023/0039043 A1* | 2/2023 | Jeon | B60W 10/184 |
| 2024/0083457 A1* | 3/2024 | Dallas | B60W 30/09 |
| 2024/0109423 A1* | 4/2024 | Sujan | B60L 7/18 |

* cited by examiner

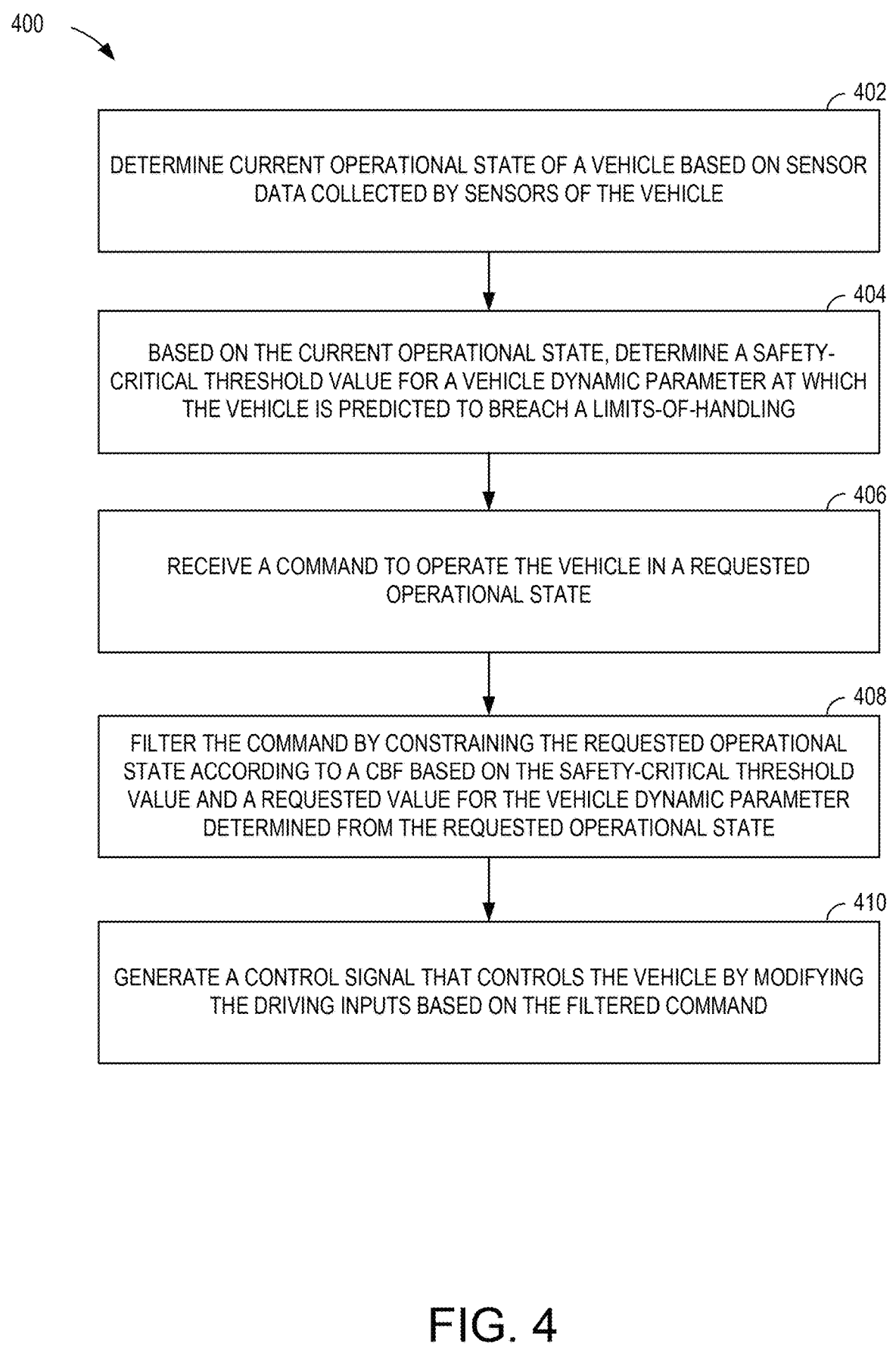

400

402

DETERMINE CURRENT OPERATIONAL STATE OF A VEHICLE BASED ON SENSOR DATA COLLECTED BY SENSORS OF THE VEHICLE

404

BASED ON THE CURRENT OPERATIONAL STATE, DETERMINE A SAFETY-CRITICAL THRESHOLD VALUE FOR A VEHICLE DYNAMIC PARAMETER AT WHICH THE VEHICLE IS PREDICTED TO BREACH A LIMITS-OF-HANDLING

406

RECEIVE A COMMAND TO OPERATE THE VEHICLE IN A REQUESTED OPERATIONAL STATE

408

FILTER THE COMMAND BY CONSTRAINING THE REQUESTED OPERATIONAL STATE ACCORDING TO A CBF BASED ON THE SAFETY-CRITICAL THRESHOLD VALUE AND A REQUESTED VALUE FOR THE VEHICLE DYNAMIC PARAMETER DETERMINED FROM THE REQUESTED OPERATIONAL STATE

410

GENERATE A CONTROL SIGNAL THAT CONTROLS THE VEHICLE BY MODIFYING THE DRIVING INPUTS BASED ON THE FILTERED COMMAND

FIG. 4

CONTROL BARRIER FUNCTIONS FOR SAFETY-CRITICAL CONTROL OF AUTOMOTIVE STABILITY

CROSS-REFERENCE TO RELATED APPLICATIONS

This application claims the benefit of U.S. Provisional Application No. 63/627,335 filed on Jan. 31, 2024, and which is hereby incorporated herein by reference in its entirety.

TECHNICAL FIELD

The present disclosure relates generally to automotive systems and technologies, and, more particularly, some embodiments relate to fully autonomous or semi-autonomous operation of a vehicle to prevent the vehicle from entering unsafe driving states.

DESCRIPTION OF RELATED ART

Some vehicles may operate in either a semi-autonomous mode (e.g., a driver-in-the-loop mode) or fully autonomous driving mode. In a semi-autonomous mode, an autonomous driving system in a vehicle may support a human driver who is providing driving inputs. For example, a driver may be actively performing any of a steering operation, an acceleration operation, and a brake operation of the vehicle, while a controller performs some subset of one or more of those operations, e.g., in an assistive, complementary, or corrective manner. By contrast, in a fully autonomous mode, the controller is in complete control of driving without human driver input.

A single-track bicycle model for vehicles is a model used to develop model-based vehicle controllers for fully autonomous mode or semi-autonomous mode. Such controllers have utilized the single-track bicycle model to demonstrate path-tracking and obstacle avoidance near limits-of-handling of a vehicle. The limit-of-handling is a condition of a vehicle in which, for example, tire-road forces have saturated.

BRIEF SUMMARY OF THE DISCLOSURE

According to various embodiments of the disclosed technology a vehicle having a semi-autonomous and a fully autonomous driving mode is provided, which can be controlled using a safety-critical control scheme that maintains vehicle operation within its limits-of-handling.

In accordance with some embodiments, a method for controlling a vehicle is provided. The method comprises determining a current operational state of a vehicle based on sensor data collected by sensors on the vehicle and, based on the current operational state, determining a safety-critical threshold value for a vehicle dynamic parameter at which the vehicle is predicted to breach a limit-of-handling. The method also includes receiving a command to operate the vehicle in a requested operational state, the command comprising driving inputs for operating the vehicle in the requested operational state. The command can be filtered by constraining the requested operational state according to a control barrier function based on the safety-critical threshold value and a requested value of the vehicle dynamic parameter determined from the requested operational state. A control signal can be generated that controls the vehicle by modifying the driving inputs based on the filtered command.

In another aspect, a vehicle control system is provided that comprises a memory storing instructions and a processor coupled to the memory. The one or more processors are configured to execute the instructions determine a current operational state of a vehicle based on sensor data collected by sensors on the vehicle and, based on the current operational state, determine a safety-critical threshold value for a vehicle dynamic parameter at which the vehicle is predicted to breach a limits-of-handling. The one or more processors are further configured to execute the instructions receive a command to operate the vehicle in a requested operational state, the command comprising driving inputs for operating the vehicle in the requested operational state; filter the command by constraining the requested operational state according to a control barrier function based on the safety-critical threshold value and a requested value of the vehicle dynamic parameter determined from the requested operational state; and generate a control signal that controls the vehicle by modifying the driving inputs based on the filtered command.

In another aspect, a vehicle is provided. The vehicle comprises a processor and a memory coupled to the processor to store instructions, that when executed by the processor, cause the processor to perform operations. The operations comprise determining a critical wheel slip threshold that anticipates a limits-of-handling of a vehicle based on first vehicle dynamics of the vehicle computed from a real-world operational state of the vehicle; predicting a wheel slip value for a nominal control command by solving a vehicle control algorithm for second vehicle dynamics using a requested operational state for the vehicle based on the nominal control command that tracks a reference trajectory; modifying the nominal control command by constraining the predicted wheel slip value to the critical wheel slip threshold; and operating the vehicle according to the modified control command.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 is a flow chart illustrating example operations for safety-critical control of a vehicle in accordance with various embodiments disclosed herein.

Figure 1:
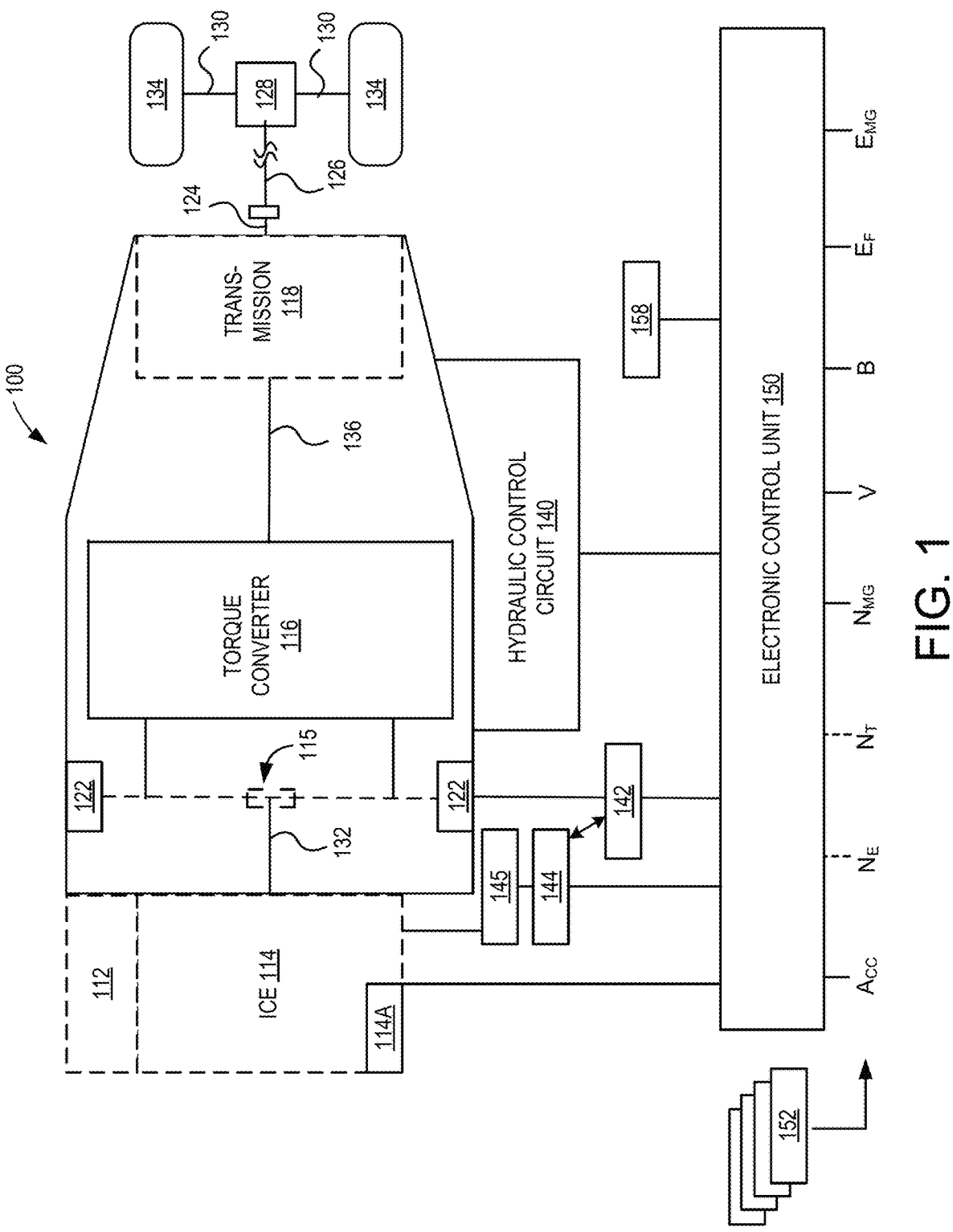
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

As alluded to above, some vehicles may operate in either a semi-autonomous or a fully autonomous driving mode. In the semi-autonomous driving mode, an autonomous driving system may receive commands for controlling the vehicle in the form of inputs from a human driver which may indicate the driver's desired path of travel. Accordingly, based on the received driving inputs, the autonomous driving system may selectively provide corrective assistance. For example, the autonomous driving system may provide steering corrections to maintain a vehicle in the center of a lane. In other examples, the autonomous driving system may apply automatic braking in order to avoid/mitigate a collision. In a fully autonomous mode, the autonomous driving system has complete control over driving, without human driver input. Here, the autonomous driving system must determine/execute driving commands which track a desired trajectory.

Whether operating in a semi-autonomous mode or a fully autonomous mode, autonomous driving systems may utilize an algorithm-based control scheme to control a vehicle according to a vehicle model. As alluded to above, autonomous driving systems have utilized a single-track bicycle model to demonstrate path-tracking and obstacle avoidance near limits-of-handling. In these applications, tire-road force utilization may need to be maximized to execute safety-necessitated vehicle maneuvers (also referred to herein as safety-critical vehicle maneuvers) at the limits-of-handling. However, as roads, weather and tire-wear change over time, vehicle models can become less accurate, resulting in errors in modeling vehicle dynamics from driving commands. This can cause a vehicle to inadvertently breach its limits-of-handling.

Some conventional approaches have explored safety-necessitated vehicle maneuvers at the limits-of-handling. For example, model predictive control (MPC) has extended investigations for achievable vehicle safety maneuvers to beyond the limits-of-handling, where conventional controllers, such as linear-quadratic regulators (LQR), have found utility. Additionally, stability envelopes in the yaw rate-sideslip phase-plane have been explored using the bicycle model. These approaches have demonstrated that, with a controller well-tuned for a given vehicle and road surface, a bicycle model can achieve fidelity for safety-critical and extreme vehicle maneuvers.

In the above conventional approaches, a brush tire model uses parameters such as tire-road friction coefficient and stiffness to estimate tire forces in control formulations. Although there exist methods for real-time estimation of these parameters, the generated ground truth tire-road forces are additionally affected by hard-to-model parameters, such as vehicle-velocity dependent transients in the tire-road force dynamics, load transfer during extreme vehicle maneuvers, and actuator-level time-delays. These exogenous effects can reduce the accuracy of tire models. Traditionally, extended Kalman filters and observers can provide estimates of ground-truth tire-road forces robust to model errors. However, their relation to errors in modeling vehicle dynamics is much less explored. In the face of modeling errors, robust control approaches have been applied. However, the relation of the model errors to the errors in model-based tire-road force estimates is much less investigated. Data-driven methods for vehicle planning and control can circumvent modeling errors. But, it is non-trivial to retrieve a meaningful representation of instantaneous ground-truth tire forces from the underlying learned vehicle models.

The technology of the present disclosure overcomes the above technical shortcomings by providing for safety-critical control of vehicle at or near the limits-of-handling by maximizing utilization of tire-road forces while constraining vehicle operation to within its handling limits, despite errors in modeling the vehicle dynamics. Implementations of the disclosed technology can estimate these errors and incorporate the errors into safety-critical constraints that respect the limits-of-handling, in real-time. Examples disclosed herein provide input-to-state stable nonlinear observers that estimate errors in the dynamics of bicycle model and relate these errors to ground-truth tire-road forces. Examples disclosed herein also provide a robustified control barrier function based quadratic program (RCBF-QP) formulation to constrain a vehicle to within its limits-of-handling during safety-necessitated aggressive maneuvers, despite the presence of model errors.

Examples of the present disclosure can anticipate when a vehicle approaches its limits-of-handling and safely constrain vehicle dynamics to within these limits. As noted above, embodiments disclosed herein provide observers configured to estimate errors in dynamics, which can be translated into corrective dynamics that can improve estimates. A control barrier function (CBF), implemented in an example as a RCBF-QP, can be configured to filter control commands to constrain the commands to within handling limits, for example, by applying safety-critical constraints to nominal control commands received from a driver and/or an autonomous driving system. Model errors observed by the observers can be incorporated into the CBF to generate safety-critical constraints that can maintain the vehicle dynamics within the limits-of-handling.

An operational state of a vehicle (also referred to herein as an vehicle state) may refer to a data set associated with the contemporaneous operation of a vehicle. In an illustrated example, a operational state can be comprised of plurality of states, such as but not limited to, vehicle velocities, wheel angular velocity, yaw rate, and the like. However, in other embodiments operational states may be comprised of any number of states. Data constituting an operational state can be obtained from sensors and vehicle systems. Vehicle dynamics, as used herein, may refer to parameters obtained from sensor data, including operational states, as well as parameters determined through models (e.g., vehicle and tire models). Accordingly, vehicle dynamics may include a number of states, such as but not limited to, vehicle velocities, wheel angular velocity, and yaw rate, as operational states, and wheel slip determined from a model applied to sensor data and operational states.

As used herein, the term "safety-critical" and the like can mean operating conditions that avoid a dangerous scenario, such as but not limited to, loss of control of a vehicle that can lead to a collision or other event that can result in human injury and/or death, property damage (including damage to the vehicle), environmental harm, etc. For example, "safety-critical vehicle dynamics," such as safety-critical wheel slip value" can refer to vehicle dynamics at a limit-of-handling of the vehicle. As another example, "safety-critical control" may refer to semi- or fully autonomous control of a vehicle that is constrained to avoid exceeding a limit-of-handling, for examples, by constraining vehicle operational states to be below or equal to the limit-of-handling. Other phrases herein that utilize the term "safety-critical" are understood to have similar usage and meaning.

Examples of the disclosed technology provide for methods, systems, and devices that provide for controlling a vehicle according to vehicle dynamics constrained within the limits-of-handling of the vehicle. In some examples, current operational states of a vehicle can be obtained from sensor data collected by sensors on the vehicle. Based on the current operational state, a safety-critical threshold value for one or more vehicle dynamic parameters can be determined, for example, by applying the current operational states to one or more vehicle dynamic models. The safety-critical threshold value may be representative of a value of a vehicle dynamic parameter at which the vehicle is predicted to breach a limits-of-handling for the current operational state. Said another way, the safety-critical threshold value may represent conditions that anticipate when the vehicle is approaching its limits-of-handling. A command can be received that requests to operate the vehicle in a requested operational state. The command can include driving inputs, such as, but not limited to, steering, brake, and throttle inputs for controlling the vehicle at the requested operational state. The inputs may be provided by a driver, an autonomous driving system, or a combination thereof. Requested values for one or more vehicle dynamic parameters can be determined from the requested operational state, for example, by applying the requested operational states to the one or more vehicle models. The command can then be filtered by constraining the requested operational state according to a CBF based on the safety-critical threshold value, as a safety-critical constraint on the vehicle dynamic parameter, and the requested value of the vehicle dynamic parameter. A control signal can be generated and provided to an autonomous driving system for executing the filtered command to control the vehicle.

In examples, filtering of the command may include a determination that controlling the vehicle in the requested operational state would result in operation of the vehicle in an unsafe driving state beyond its limits-of-handling. Accordingly, the disclosed technology can determine a safety-critical threshold value for a vehicle dynamic parameter and trigger safety-critical control of the vehicle in a case where the requested value for the vehicle dynamic parameter exceeds the safety-critical threshold value. Examples herein can constrain the requested operational state by modifying the command to operate the vehicle in an actual, real-world operational state in which the vehicle dynamic parameter does not exceed (e.g., is less than or equal to) the safety-critical threshold value. Modifying the command may include adjusting inputs, by the autonomous driving system, for controlling the vehicle so to constrain the vehicle according to the limits-of-handling. Adjusting the inputs can include thresholding or modifying the inputs with a maximum safety-critical value that the actual executed operations of the vehicle, when performing a maneuver, is not to exceed.

Vehicle dynamics may refer to parameters that can define the movement of a vehicle based on inputs into vehicle systems that operate the vehicle. The inputs may define operational states of the vehicle and affect the vehicles movement. Vehicle dynamics may be grouped into drivetrain and braking dynamics, suspension and steering dynamics, distribution of mass dynamics, aerodynamics dynamics, and tire dynamics. Examples of drivetrain and braking parameters include, but are not limited to, vehicle layout (i.e. location of engine and driven wheels), powertrain, and braking system. Examples of suspension and steering parameters include, but are not limited to, Ackermann steering geometry, axle track, camber angle, caster angle, ride height, roll center, scrub radius, steering ratio, toe, wheel alignment, and wheelbase. Examples of distribution of mass parameters include, but are not limited to, center of mass, moment of inertia, roll moment, sprung mass, unsprung mass, and weight distribution. Examples of aerodynamics parameters include, but are not limited to, drag coefficient, vehicle aerodynamics, center of pressure, downforce, and ground effects. Examples of tire parameters include, but are not limited to, camber thrust, circle of forces, contact patch, cornering force, ground pressure, Pacejka's Magic Formula, pneumatic trail, Radial Force Variation, relaxation length, rolling resistance, self-aligning torque, tire saturation at which one or more tires are slipping relative to the road surface and overall handling is affected (e.g., spinout and/or skid), wheel slip angle, wheel slip (e.g., relative motion between tire and road surface), steering ratio, and tire load sensitivity.

Accordingly, reference herein to a "vehicle dynamic" or "vehicle dynamic parameter" may be used to refer to any one or more of the above parameters from any grouping. Whereas, reference to a particular grouping (e.g., tire dynamics) will be understood to refer to parameters of that particular grouping. Thus, reference to "vehicle dynamics" and/or "vehicle dynamic parameters" may refer to tire dynamics and other vehicle dynamics and related parameters.

In an illustrative example, the safety-critical threshold value may be determined for a tire dynamic parameter. In a particular example, the tire dynamic parameter is a combined wheel slip, in which case the safety-critical threshold value may be critical wheel slip value at which tire saturation is predicted to occur given a current operational state of the vehicle. In this example, the requested value may be an amount of wheel slip requested based on a requested operational state applied to the vehicle dynamic model. Accordingly, the disclosed technology can determine the critical wheel slip value from current operational states and trigger safety-critical control of the vehicle in a case where the requested wheel slip value is predicted to exceed the safety-critical wheel slip threshold value. The safety-critical control can constrain the requested operational state by modifying inputs of the command to operate the vehicle to a safety-constrained operational state in which the constrained wheel slip value does not exceed (e.g., is less than or equal to) the critical wheel slip value.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for autonomously controlling a vehicle having semi-autonomous and fully autonomous modes can be implemented in other types of vehicle including gasoline- or diesel-powered vehicles, fuel-cell vehicles, electric vehicles, or other vehicles.

FIG. 1 illustrates a drive system of an example vehicle 100 that may include an internal combustion engine 114 and one or more electric motors 122 (which may also serve as generators) as sources of motive power. Driving force generated by the internal combustion engine 114 and motors 122 can be transmitted to one or more wheels 134 via a torque converter 116, a transmission 118, a differential gear device 128, and a pair of axles 130.

As an HEV, vehicle 100 may be driven/powered with either or both of engine 114 and the motor(s) 122 as the drive source for travel. For example, a first travel mode may be an engine-only travel mode that only uses internal combustion engine 114 as the source of motive power. A second travel mode may be an EV travel mode that only uses the motor(s) 122 as the source of motive power. A third travel mode may be an HEV travel mode that uses engine 114 and the motor(s) 122 as the sources of motive power. In the engine-only and HEV travel modes, vehicle 100 relies on the motive force generated at least by internal combustion engine 114, and a clutch 115 may be included to engage engine 114. In the EV travel mode, vehicle 100 is powered by the motive force generated by motor 122 while engine 114 may be stopped and clutch 115 disengaged.

Engine 114 can be an internal combustion engine such as a gasoline, diesel or similarly powered engine in which fuel is injected into and combusted in a combustion chamber. A cooling system 112 can be provided to cool the engine 114 such as, for example, by removing excess heat from engine 114. For example, cooling system 112 can be implemented to include a radiator, a water pump and a series of cooling channels. In operation, the water pump circulates coolant through the engine 114 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 114. In other applications, either or both the water pump and the fan may be operated by electric current such as from battery 144.

An output control circuit 114A may be provided to control drive (output torque) of engine 114. Output control circuit 114A may include a throttle actuator to control an electronic throttle valve that controls fuel injection, an ignition device that controls ignition timing, and the like. Output control circuit 114A may execute output control of engine 114 according to a control command signal(s) supplied from an electronic control unit 150, described below. Such output control can include, for example, throttle control, fuel injection control, and ignition timing control.

Motor 122 can also be used to provide motive power in vehicle 100 and is powered electrically via a battery 144. Battery 144 may be implemented as one or more batteries or other power storage devices including, for example, lead-acid batteries, nickel-metal hydride batteries, lithium ion batteries, capacitive storage devices, and so on. Battery 144 may be charged by a battery charger 145 that receives energy from internal combustion engine 114. For example, an alternator or generator may be coupled directly or indirectly to a drive shaft of internal combustion engine 114 to generate an electrical current as a result of the operation of internal combustion engine 114. A clutch can be included to engage/disengage the battery charger 145. Battery 144 may also be charged by motor 122 such as, for example, by regenerative braking or by coasting during which time motor 122 operate as generator.

Motor 122 can be powered by battery 144 to generate a motive force to move the vehicle and adjust vehicle speed. Motor 122 can also function as a generator to generate electrical power such as, for example, when coasting or braking. Battery 144 may also be used to power other electrical or electronic systems in the vehicle. Motor 122 may be connected to battery 144 via an inverter 142. Battery 144 can include, for example, one or more batteries, capacitive storage units, or other storage reservoirs suitable for storing electrical energy that can be used to power motor 122. When battery 144 is implemented using one or more batteries, the batteries can include, for example, nickel metal hybrid batteries, lithium ion batteries, lead acid batteries, nickel cadmium batteries, lithium ion polymer batteries, and other types of batteries.

An electronic control unit 150 (described below) may be included and may control the electric drive components of the vehicle as well as other vehicle components. For example, electronic control unit 150 may control inverter 142, adjust driving current supplied to motor 122, and adjust the current received from motor 122 during regenerative coasting and braking. As a more particular example, output torque of the motor 122 can be increased or decreased by electronic control unit 150 through the inverter 142.

A torque converter 116 can be included to control the application of power from engine 114 and motor 122 to transmission 118. Torque converter 116 can include a viscous fluid coupling that transfers rotational power from the motive power source to the driveshaft via the transmission. Torque converter 116 can include a conventional torque converter or a lockup torque converter. In other embodiments, a mechanical clutch can be used in place of torque converter 116.

Clutch 115 can be included to engage and disengage engine 114 from the drivetrain of the vehicle. In the illustrated example, a crankshaft 132, which is an output member of engine 114, may be selectively coupled to the motor 122 and torque converter 116 via clutch 115. Clutch 115 can be implemented as, for example, a multiple disc type hydraulic frictional engagement device whose engagement is controlled by an actuator such as a hydraulic actuator. Clutch 115 may be controlled such that its engagement state is complete engagement, slip engagement, and complete disengagement complete disengagement, depending on the pressure applied to the clutch. For example, a torque capacity of clutch 115 may be controlled according to the hydraulic pressure supplied from a hydraulic control circuit (not illustrated). When clutch 115 is engaged, power transmission is provided in the power transmission path between the crankshaft 132 and torque converter 116. On the other hand, when clutch 115 is disengaged, motive power from engine 114 is not delivered to the torque converter 116. In a slip engagement state, clutch 115 is engaged, and motive power is provided to torque converter 116 according to a torque capacity (transmission torque) of the clutch 115.

As alluded to above, vehicle 100 may include an electronic control unit 150. Electronic control unit 150 may include circuitry to control various aspects of the vehicle operation. Electronic control unit 150 may include, for example, a microcomputer that includes a one or more processing units (e.g., microprocessors), memory storage (e.g., RAM, ROM, etc.), and I/O devices. The processing units of electronic control unit 150, execute instructions stored in memory to control one or more electrical systems or subsystems 158 in the vehicle. Electronic control unit 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 150 receives information from a plurality of sensors included in vehicle 100. For example, electronic control unit 150 may receive signals that indicate vehicle operating conditions or characteristics, or signals that can be used to derive vehicle operating conditions or characteristics. These may include, but are not limited to accelerator operation amount ($A_{CC}$), a revolution speed ($N_E$) of internal combustion engine 114 (engine RPM), a rotational speed ($N_{MG}$) of the motor 122 (motor rotational speed), and vehicle speed ($N_V$). These may also include torque converter 116 output ($N_T$) (e.g., output amps indicative of motor output) and brake operation amount/pressure (B). Accordingly, vehicle 100 can include a plurality of sensors 152 that can be used to detect various conditions internal or external to the vehicle and provide sensed conditions to engine control unit 150 (which, again, may be implemented as one or a plurality of individual control circuits). In one embodiment, sensors 152 may be included to detect one or more conditions directly or indirectly such as, for example, fuel efficiency ($E_F$), motor efficiency ($E_{MG}$) hybrid (internal combustion engine 114+MG 122) efficiency, etc. Sensors 152 may be used to detect the various operational states and calculate vehicle dynamics, such as wheel slip (e.g., critical slip, combined slip, etc.) lateral and longitudinal slop, steering angles, vehicle mass, vehicle yaw moment of inertia, and acceleration due to gravity. Accordingly, vehicle 100 can include a plurality of sensors 152 that can be used to detect various conditions internal or external to the vehicle and provide sensed conditions to engine control unit 150 (which, again, may be implemented as one or a plurality of individual control circuits).

In some embodiments, one or more of the sensors 152 may include their own processing capability to compute the results for additional information that can be provided to electronic control unit 150. In other embodiments, one or more sensors may be data-gathering-only sensors that provide only raw data to electronic control unit 150. In further embodiments, hybrid sensors may be included that provide a combination of raw data and processed data to electronic control unit 150. Sensors 152 may provide an analog output or a digital output.

Sensors 152 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect objects in an environment surrounding vehicle 100, for example, traffic signs indicating a current speed limit, road curvature, obstacles, surrounding vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
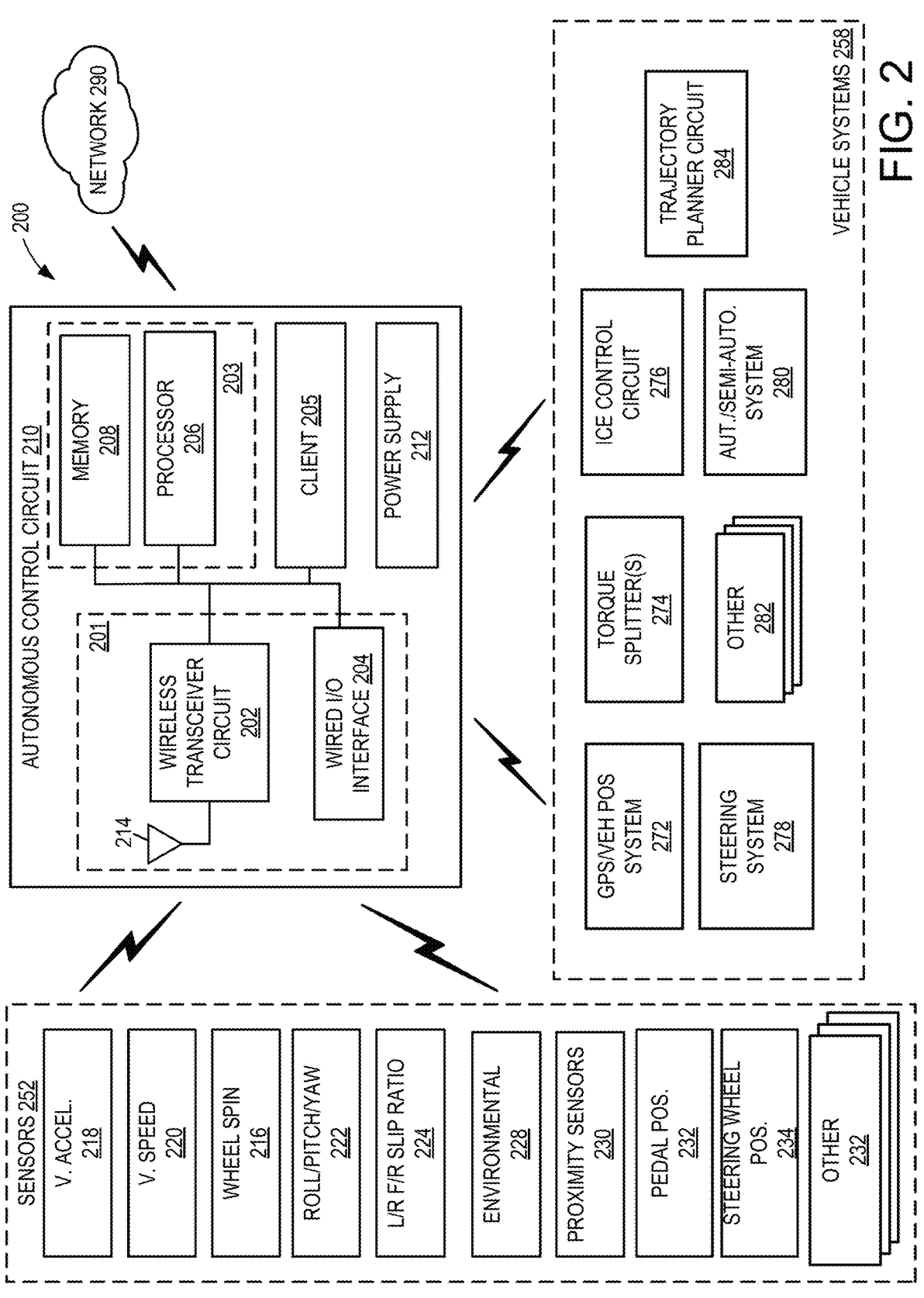
FIG. 2 illustrates an example architecture for safety-critical control of a vehicle in accordance with one embodiment of the systems and methods described herein.

FIG. 2 illustrates an example architecture for safety-critical control of a vehicle in accordance with one embodiment of the systems and methods described herein. Referring now to FIG. 2, in this example, autonomous driving system 200 includes an autonomous control circuit 210, a plurality of sensors 252 and a plurality of vehicle systems 258. Sensors 252 (such as sensors 152 described in connection with FIG. 1) and vehicle systems 258 (such as subsystems 158 described in connection with FIG. 1) can communicate with autonomous control circuit 210 via a wired or wireless communication interface. Although sensors 252 and vehicle systems 258 are depicted as communicating with autonomous control circuit 210, they can also communicate with each other as well as with other vehicle systems. Autonomous control circuit 210 can be implemented as an ECU or as part of an ECU such as, for example electronic control unit 150. In other embodiments, autonomous control circuit 210 can be implemented independently of the ECU. Autonomous control circuit 210 may be an example implementation of the controller/driver of FIG. 1.

Autonomous control circuit 210 in this example includes a communication circuit 201, a decision circuit 203 (including a processor 206 and memory 208 in this example) and a power supply 212. Components of autonomous control circuit 210 are illustrated as communicating with each other via a data bus, although other communication in interfaces can be included. Autonomous control circuit 210 in this example also includes client 205 that can be operated to connect to an edge server of a network 290 to download models, such as a vehicle dynamic model and a tire model. In examples, a single-track dynamic bicycle model is used as a vehicle dynamic model that is trained to predict vehicle dynamics from operational states input into the model. In examples, the tire model may be a combined slip tire model (e.g., a Fiala tire model) trained to estimate tire forces from operational states input into the model.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store instructions and variables for processor 206 as well as any other suitable information, such as, one or more of the following elements: sensor data, vehicle parameters (e.g., vehicle mass, distance between the center of gravity of the vehicle to each axle, distance between the center of gravity of the vehicle and road surface, etc.), operational states (e.g., longitudinal velocity, lateral velocity, yaw velocity, wheel speed at each axle, roadwheel angle, engine torque, and front and rear brake torque, etc.), and vehicle dynamics (e.g., lateral wheel slip, longitudinal wheel slip, load on each tire, vehicle yaw moment of inertia, the acceleration due to gravity, tire-road friction, lateral tire-road stiffness, wheelspin, longitudinal weight transfer state, etc.), including tire forces (e.g., load on each tire). Operational states may be determined from sensor data collected by sensors 252, which can be applied to the vehicle and tire models, along with the vehicle parameters, to obtain vehicle dynamics. Memory 207 may also store a reference trajectory as a number of points that form a desired path of travel and reference vehicle dynamics for each point selected for the vehicle to follow the path of travel. The reference trajectory may represent an ideal trajectory and operational states for achieving the ideal trajectory. In various embodiments, memory 208 may also store course error (e.g., difference between actual trajectory of the vehicle and the reference trajectory). Memory 208 can be made up of one or more modules of one or more different types of memory, and may be configured to store data and other information as well as operational instructions that may be used by the processor 206 to autonomous control circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up an autonomous control circuit 210.

Communication circuit 201 includes either or both a wireless transceiver circuit 202 with an associated antenna 214 and a wired I/O interface 204 with an associated hardwired data port (not illustrated). Communication circuit 201 can provide for vehicle-to-everything (V2X) and/or vehicle-to-vehicle (V2V) communications capabilities, allowing autonomous control circuit 210 to communicate with edge devices, such as roadside unit/equipment (RSU/ RSE), network cloud servers and cloud-based databases, and/or other vehicles via network 290. For example, V2X communication capabilities allows autonomous control circuit 210 to communicate with edge/cloud servers, roadside infrastructure (e.g., such as roadside equipment/roadside unit, which may be a vehicle-to-infrastructure (V2I)-enabled street light or cameras, for example), etc. autonomous control circuit 210 may also communicate with other connected vehicles over vehicle-to-vehicle (V2V) communications.

As this example illustrates, communications with autonomous control circuit 210 can include either or both wired and wireless communications circuits 201. Wireless transceiver circuit 202 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by autonomous control circuit 210 to/from other entities such as sensors 252 and vehicle systems 258.

Wired I/O interface 204 can include a transmitter and a receiver (not shown) for hardwired communications with other devices. For example, wired I/O interface 204 can provide a hardwired interface to other components, including sensors 252 and vehicle systems 258. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 252 can include, for example, sensors 152 such as those described above with reference to the example of FIG. 1. Sensors 252 can include additional sensors that may or may not otherwise be included on a standard vehicle with which the autonomous driving system 200 is implemented. In the illustrated example, sensors 252 include vehicle acceleration sensors 218, vehicle speed sensors 220, wheel-spin sensors 216 (e.g., one for each wheel), accelerometers such as a 2-axis accelerometer 222 to detect roll, pitch and yaw of the vehicle, environmental sensors 228 (e.g., to detect salinity or other environmental conditions), left-right and front-rear slip ratio sensors 224, proximity sensor 230 (e.g., sonar, radar, lidar or other vehicle proximity sensors), throttle engagement and brake engagement sensors 232 (i.e. accelerator pedal position and/or brake pedal position), and steering wheel position sensors 234 (e.g., steering angle sensor that measures a steering wheel position angle and rate of turn). Additional sensors 232 can also be included as may be appropriate for a given implementation of autonomous driving system 200. For example, there may be additional sensors for detecting and/or computing sideslip velocities, sideslip angles, percent sideslip, frictional forces, degree of steer, heading, and trajectory. Additionally, there may be sensors for detecting and/or computing front tire slip angle corresponding to full tire saturation, rear tire slip angle corresponding to full tire saturation, maximum stable steering angle given speed/friction, coefficient of friction between vehicle 10 tires and roadway, etc. As alluded to above, there may also be sensors for total lateral force, rear lateral force, front lateral force, longitudinal speed, lateral speed, longitudinal acceleration, brake engagement, steering wheel position, time derivatives of steering wheel position, throttle, time derivatives of throttle, etc.

Vehicle or sensor data may also include vehicle parameters representative of physical characteristics of the vehicle. Examples of vehicle parameters (or vehicle specifications) include, but are not limited to, vehicle mass, distance between the center of gravity of the vehicle an each axle, and distance between the vehicle center of gravity and road surface.

Vehicle systems 258, for example, systems and subsystems 158 described above with reference to the example of FIG. 1, can include any of a number of different vehicle components or subsystems used to control or monitor various aspects of the vehicle and its performance. In this example, the vehicle systems 258 includes a vehicle positioning system 272; engine control circuits 276 to control the operation of engine (e.g. internal combustion engine 114 and/or motors 122); torque splitters 274 that can control distribution of power among the wheels such as, for example, by controlling front/rear and left/right torque split; steering system 278 (which may be the steering by-wire system described in conjunction with FIG. 1) to turn the wheels of vehicle; and other vehicle systems 282 (e.g., Advanced Driver-Assistance Systems (ADAS), autonomous or semi-autonomous driving systems 280, such as forward/ rear collision detection and warning systems, pedestrian detection systems, autonomous or semi-autonomous driving systems, and the like). Vehicle systems 258 may also include the brake-by-wire system described in conjunction with FIG. 1.

Autonomous or semi-autonomous driving systems 280 can be operatively connected to the various vehicle systems 258 and/or individual components thereof. For example, autonomous or semi-autonomous driving systems 280 can send commands and/or receive information from the various vehicle systems 258 to control the movement, speed, maneuvering, heading, direction, etc. of the vehicle. The autonomous or semi-autonomous driving systems 280 may control some or all of these vehicle systems 258 and, thus, may be semi- or fully autonomous. Commands may include inputs, which can provide autonomous control of the various systems 258. For example, a steering input may be provide a degree of steering for controlling a heading direction of a vehicle. The steering input may be provided, for example, by as a steering position angle and rate of turn detected by the steering wheel position sensor 234 based on a driver operating a steering wheel. In another example, the autonomous or semi-autonomous driving system 280 may generate a steering position angle and rate of turn. In either case, the steering position angle and rate of turn can be provided to a steering system 278 for steering the vehicle. In another example, braking inputs can be detected by brake engagement sensors 232 based on the driver interacting with a brake pedal or generated by autonomous or semi-autonomous driving system 280 to control a brake-by-wire system. In yet another example, throttle inputs can be detected by throttle engagement sensors 232 based on the driver interacting with an accelerator pedal or generated by autonomous or semi-autonomous driving system 280 to control engine control circuits 276.

Vehicle systems 258 may also include a trajectory or motion planner circuit 284 configured to generate a reference trajectory as path of travel over a time horizon. For example, in some embodiments the trajectory planner may be provided by an object map generation system, such as that described in U.S. Pat. No. 11,488,395, the disclosure of which is incorporated herein by reference in its entirety. The trajectory planner circuit 284 generates a desired path of travel for the vehicle for a defined time horizon (e.g., a future or feedforward function of time). The trajectory planner circuit 284 may determine a number of points or positions (referred to as waypoints) along a path, along with a time projection for that point (e.g., a time at which the vehicle is desired to be at that planned point). For each waypoint, the trajectory planner circuit 284 may determine operational states, and vehicle dynamics, for controlling the vehicle to navigate between each waypoint. The trajectory provided by the trajectory planner circuit 284 may define physical bounds (e.g., lateral bounds, heading bounds, and velocity bounds) on the operational states for operating the vehicle that provide a kinematically or dynamically feasible path along the waypoints of the trajectory. The trajectory can also provide operational states, such as but not limited to, velocity, yaw rate, etc. The trajectory planner circuit 284 can feed the trajectory to autonomous or semi-autonomous driving systems as a time varying reference values for positions and/or operational states for the defined time horizon.

Network 290 may be a conventional type of network, wired or wireless, and may have numerous different configurations including a star configuration, token ring configuration, or other configurations. Furthermore, the network 290 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 290 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 2G, 4G, 5G, LTE, LTE-V2V, LTE-V2I, LTE-V2X, LTE-D2D, VoLTE, 5G-V2X or any other mobile data network or combination of mobile data networks. Further, the network 290 may include one or more IEEE 802.11 wireless networks.

During operation, autonomous control circuit 210 can receive information from various sensors 252 and/or vehicle systems 258, which can be used to determine what autonomous driving actions to take. Communication circuit 201 can be used to transmit and receive information between autonomous control circuit 210 and sensors 252, as well as between autonomous control circuit 210 and vehicle systems 258. Also, sensors 252 may communicate with vehicle systems 258 directly or indirectly (e.g., via communication circuit 201 or otherwise).

In various embodiments, communication circuit 201 can be used to send a control command signal or other control information to various vehicle systems 258 as part of executing a driving command. For example, communication circuit 201 can be used to send control command signals to, for example, one or more of: torque splitters 274 to control front/rear torque split and left/right torque split; ICE control circuit 276 to, for example, control motor torque, motor speed of the various motors in the system; steering system 278; and other systems 282 to, for example, control the systems according to inputs included in the command signal. The decision regarding what action to take via these various vehicle systems 258 can be made based on the information detected by sensors 252, as well as based on safety-critical constraints determined by the autonomous control circuit 210.

In an example, the autonomous control circuit 210 can obtain sensor data from sensors 252 that define current operational states of the vehicle. The autonomous control circuit 210 can determine a safety-critical threshold value for one or more vehicle dynamic parameters based on the current operational states applied to the vehicle dynamic model and/or tire model. The safety-critical threshold value may be representative of vehicle dynamics at which the vehicle is predicted to breach its limits-of-handling for the current operational states. Thus, autonomous control circuit 210 can use the safety-critical threshold value to anticipate when the vehicle is approaching its limits-of-handling and may enter unsafe driving states.

The autonomous control circuit 210 may receive a control command signal, for example, from vehicle systems 258, to control the vehicle in a requested operational state. The control command may include inputs provided by one or more of a driver and the autonomous or semi-autonomous driving systems 280. Requested values for vehicle dynamic parameters can be determined from the requested operational state by applying the requested operational state as inputs to the vehicle dynamic model and/or tire model.

The autonomous control circuit 210 may then filter the command by constraining the requested operational states according to a CBF that is based on the safety-critical vehicle threshold value, as a safety-critical constraint on the vehicle dynamic parameter, and the requested value of the vehicle dynamic parameter. For example, autonomous control circuit 210 may constrain the requested operational state to maintain the vehicle in an operational state in which the actual, real-world value vehicle dynamic parameter does not exceed (e.g., is less than or equal to) the safety-critical vehicle threshold value. The autonomous control circuit 210 can generate a control signal that can be provided to the autonomous or semi-autonomous driving systems 280 for effectuating the filtered command by adjusting the inputs of the command in a way to maintain vehicle operation within the limits-of-handling.

Figure 3:
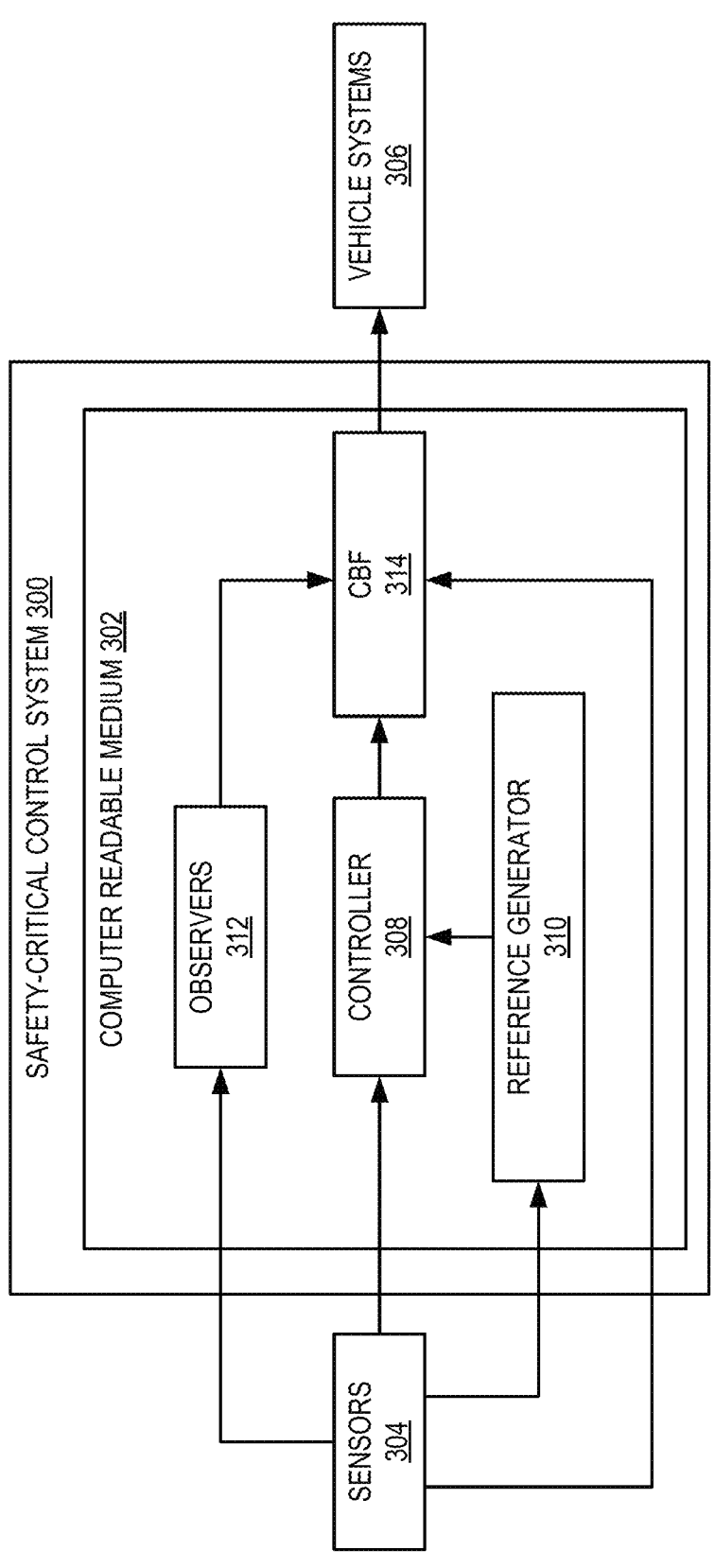
FIG. 3 is an illustrative representation of a computer system for implementing safety-critical control in accordance with one or more embodiments of the disclosure.

FIG. 3 is an illustrative representation of a computer system for implementing safety-critical control in accordance with one or more embodiments of the disclosure. Computer system 300 may comprise computer readable medium 302, sensors 304, and vehicle systems 306. Sensors 304 and vehicle systems 306 may be an example implementations of sensors 252 and vehicle system 258 of FIG. 2, respectively. Computer readable medium 302 may include a controller module 308, a reference generator module 310, an observer module 312, and a CBF module 314. Modules 308-314, as well as other modules may include, by way of example, components, such as software components and instructions, that may be executed by a processor to perform the functions and operations described herein. In an example, computer readable medium 302 may be included as part of decision circuit 203 (e.g., stored in memory 208) of FIG. 2. In this case, modules 308 may be executed by processor 206 to perform the functions disclosed herein.

Sensors 304 may obtain sensor data while the vehicle travels along a path over a time horizon. The sensor data may contain measurements of current vehicle operation obtained over the time horizon. The sensor data may be grouped into data sets for each sequential point in time over the time horizon to provide current operational states of the vehicle along a traveled path. For example, sensor data obtained at a given point in time and/or for a given geographic position can be grouped into a data set that constitutes an operational state of the vehicle at the given point in time and/or geographic position. Sensors 304 may also obtain measurements of current vehicle dynamics from vehicle systems 306.

Reference generator module 310 may be configured to generate a reference trajectory. The reference generator module 310 may compute a desired (e.g., ideal) trajectory for a future time horizon as a reference. Reference generator module 310 may compute the reference trajectory as a sequence of waypoints that form a path of travel from a current position of the vehicle. The waypoints may comprise an ideal position (e.g., geographic coordinate) and an ideal time of arrival of the vehicle at each waypoint. Each waypoint may also include ideal yaw rate, ideal velocity, and other ideal operational states as necessary to provide the trajectory. The reference generator module 310 may provide supply the reference trajectory for the controller module 308.

In some examples, the controller module 308 may be configured to provide for vehicle navigation according to the reference trajectory applied to a vehicle control algorithm. In examples, the controller module 308 may be configured to obtain operational states of the vehicle as it travels along a reference trajectory and compute inputs that can be executed by vehicle systems 306 for navigating the vehicle along the reference trajectory. For example, the controller module 308 obtains current and previous operational states along a path traveled by the vehicle for a past time horizon (e.g., an actual traveled trajectory). The controller module 308 applies this information to a vehicle control algorithm to compute driving inputs, such as, but not limited to, drive torque, brake torque, and steering angle, that can be used to construct a control command that can be executed by vehicle systems 306 to navigate the vehicle to waypoints of the reference trajectory along the future time horizon. When navigating from a current position to a next waypoint, the controller module 308 outputs the control command that can be communicated to the vehicle system 306. The control command can be executed to guide the vehicle to a next waypoint. The controller module 308 then reiterates the computation by updating the actual path traveled and actual operational states to recompute inputs for the next waypoint, and so on.

In examples, the vehicle control algorithm may be an MPC algorithm, in which case controller module 308 may be implemented as a model predictive controller. An MPC can be used to compute future operational states (e.g., vehicle dynamic) over a forward time horizon according to a trained model, which can be implemented to navigate the vehicle along a reference trajectory. Solving an MPC may include iterative solution of optimal control problems, over a future time horizon, and across certain time steps (e.g., waypoints of a reference trajectory). In examples, the MPC algorithm can include a nominal vehicle-tire model, such as a single-track dynamic bicycle model combined with a slip tire model, to compute vehicle dynamics over the future time horizon In various non-limiting embodiments, an MPC algorithm may be implemented to use MPC with envelope constraints in mind. Envelope constraints may include conditions to a cost function that must satisfy. The envelope constraints in some embodiments may be built into the control algorithm (for example, don't exceed yaw rate or steering angle).

As alluded to above, the controller module 308 may be configured to use a single-track dynamic bicycle model combined with a slip tire model (e.g., a slip Fiala tire model) to compute vehicle dynamics for from a current operational state. The computed vehicle dynamics may be estimates of vehicle dynamics for the current operational state. In an example implementation, the vehicle is assumed to be moving on a flat surface and air resistance is assumed to be negligible. Thus, in this example, only tire-road forces affect the vehicle dynamics. Under these assumptions, the total force generated by a tire ($F_{total}$) can be given as:

$$F_{total} = \begin{cases} C_f\sigma - \dfrac{C_f^2\sigma^2}{3\mu F_z} + \dfrac{C_f^3\sigma^3}{27(\mu F_z)^2} & |\sigma| < \sigma_{f/r}^{cr} \\ \mu F_z & |\sigma| < \sigma_{f/r}^{cr} \end{cases} \qquad \text{Eq. 1}$$

where $$\sigma_{f/r}^{cr}$$

represents the critical slip at which tires of a given lump axle saturates, $\sigma_{f/r}$ represents combined slip of a tire for a given lumped axle (also shown in Eq. 1 as without subscripts f or r, f refers to the lumped front axle tires, r refers to the lumped rear axle tires, $\mu$ represents the real-world tire-road friction, C represents the real-world lateral tire-road stiffness, and $F_z$ represents load on the tire model by applying the current operational state to the combined dynamic model. In examples, the values of $\mu$ and/or C may be assumed to be known and provided in advanced.

Critical slip $$\left(\sigma_{f/r}^{cr}\right)$$

and combined slip ($\sigma_{f/r}$) can be computed as follows:

$$\sigma_{f/r}^{cr} = \arctan\left(\frac{3\mu_{f/r}F_{z,f/r}}{C_{f/r}}\right) \approx \frac{3\mu_{f/r}F_{z,f/r}}{C_{f/r}} \qquad \text{Eq. 2}$$

$$\sigma_{f/r} = \sqrt{\kappa_{f/r}^2 + \tan^2 \alpha_{f/r}} \qquad \text{Eq. 3}$$

where $\alpha$ represents the lateral slip and $\kappa$ represents the measured longitudinal slip as measured by sensors 304 (e.g., left-right and front-rear slip ratio sensors 224).

The load on the tire ($F_z$) can be modeled with first order dynamics, for example:

$$F_{z,f/r} = \frac{mgl_{r/f}}{(l_r + l_f)} \mp dF_z \qquad \text{Eq. 4}$$

$$\dot{dF_z} = -k\left\{dF_z - \frac{h_{cg}}{l_f + l_r}F_{x,net}\right\} \qquad \text{Eq. 5}$$

where $F_c$ and $F_x$ represent the lateral and longitudinal components of the total tire force, respectively, and are given as:

$$\begin{bmatrix} F_{c,f/r} \\ F_{x,f/r} \end{bmatrix} = \frac{F_{total,f/r}}{\sigma_{f/r}} \begin{bmatrix} -\tan\alpha_{f/r} \\ \kappa_{f/r} \end{bmatrix} \qquad \text{Eq. 6}$$

The net longitudinal force ($F_{x,net}$), net lateral force ($F_y$), and net yaw moment ($M_r$) can be provided as:

$$F_{x,net} = F_{x,r} + F_{x,f}\cos\delta_f - F_{c,f}\sin\delta_f \qquad \text{Eq. 7}$$

$$F_y = F_{c,f}\cos\delta_f + F_{c,r} + F_{x,f}\sin\delta_f \qquad \text{Eq. 8}$$

$$M_r = (F_{c,f}\cos\delta_f + F_{x,f}\sin\delta_f)l_f - F_{c,r}l_r \qquad \text{Eq. 9}$$

where the measured steering angle of the front tire is denoted by $\delta_f$; m, l and g denote the vehicle mass, vehicle yaw moment of inertia and the acceleration due to gravity, respectively; l denotes the distance between the center of gravity and a respective axle; $h_{cg}$ is the distance between the vehicle center of gravity and the road surface; the longitudinal, lateral and yaw velocities of the vehicle are denoted as $v_x$, $v_y$ and r, respectively; and $\omega$ denotes the wheel speed at an axle.

The controller module 308 can obtain the various real-world vehicle dynamics, that collectively define operational states of the vehicle, as sensor data from sensor 306 and/or as stored vehicle parameters (e.g., specifications) that define physical characteristics of a vehicle (e.g., mass of the vehicle, center of gravity, and the like may be stored in memory in advance). In this example, the operational state of the vehicle comprises one or more of the following states: the steering angle of the front tire ($\delta_f$); longitudinal velocity ($v_x$); lateral velocity ($v_y$); yaw velocities (r); wheel speed at an axle ($\omega$). The vehicle dynamics may include one or more of the following: lateral slip ($\alpha$); longitudinal slip ($\kappa$); tire-road friction ($\mu$), lateral tire-road stiffness (C), and one or more operational states. Vehicle parameters may include one or more of the following: mass of the vehicle (m); vehicle yaw moment of inertia (l); acceleration due to gravity (g); distance of center of gravity to a tire (l); and height of the vehicle center of gravity above the ground ($h_{cg}$).

As an illustrative example of an envelope constraint, for a given longitudinal velocity (v), dynamically admissible lateral velocity states v=($v_y$,r), and steering angle ($\delta_f$), there may exist non-negative constants $c_i$, i=[2, 3, ... 6], such that:

$$\left(F_y - \hat{F}_y\right) \le c_5|\tilde{v}_y| + c_6|\tilde{r}| \qquad \text{Eq. 10}$$

$$\frac{1}{I}\left(M_r - \hat{M}_r\right) \le c_3|\tilde{v}_y| + c_4|\tilde{r}| \qquad \text{Eq. 11}$$

$$\frac{\tilde{v}_y}{m}\left(F_y - \hat{F}_y\right) \le -c_1\tilde{v}_y^2 + c_2|\tilde{v}_y||\tilde{r}| \qquad \text{Eq. 12}$$

However, this envelope constraint, as well as others utilized by an MPC, may not take into account safety-critical conditions that may occur where a vehicle is approaching a limits-of-handling due to exogenous effects that negatively impact vehicle control. Current vehicle dynamics, such as tire-road force dynamics, load transfer during extreme vehicle maneuvers, and actuator-level time-delays (e.g., delays between solution computation and real-world implementations), can be difficult to estimate and model in advance and may be change based on current real-world operation parameters.

As described above, actual real-world implementation of the inputs provided by the controller module 308 may deviate from the reference trajectory (e.g., deviate in position, velocity, heading, etc.). These errors can reduce the accuracy of the combined vehicle dynamic model, which can be amplified in safety-critical conditions where errors could cause a vehicle to exceed its limits-of-handling. Accordingly, examples herein include the observers module 312 can be configured to estimate errors in models, for example, by estimating errors in vehicle dynamics and relate these errors to ground-truth tire-road forces. In examples, observers module 312 may use sensor data obtained from sensors 304 to estimate errors in the nominal vehicle-tire model. For example, observers module 312 may compare a vehicle dynamic estimated from the current operational state (e.g., as described above) to a vehicle dynamic predicted for a previously requested operational state (e.g., the requested operation state the navigate the vehicle to the current operational state). The difference between the estimated vehicle dynamic from the actual, real world operational state and the predicted vehicle dynamic may be indicative of the error in the vehicle dynamic model. These estimates can be provided to the CBF module 314 to filter nominal control commands, determined by the controller module 308, and constrain the vehicle to within its limits-of-handling. In some non-limiting examples, the observers module 312 may be implemented as input-to-state stable nonlinear observers.

The following is an illustrative example of estimating errors in vehicle dynamics performed by observers module 312. The observers module 312 may include a plurality of observers, such as, for example, observers for estimating errors in the longitudinal component ($F_x$) of the total tire force and observers for estimating errors in lateral component ($F_c$) of the total tire force ($\mu F_z$). In an example, the total tire force may be equal to the friction force ($\mu F_z$) on the tire in a case where the tire is saturated. If the tire is not saturated the total tire force may be less than the friction force.

For longitudinal component ($F_x$) observes, since the vehicle dynamics can be assumed to be affected by tire-road forces only, errors in the dynamics of the nominal vehicle dynamic model may be directly related to errors in the nominal tire model. In this example, the error in modeling the longitudinal tire force ($F_x$) is denoted as ($\Delta_{Fx}$). $\Delta_{Fx}$ may represent the difference between an estimated vehicle dynamic from the actual, real world operational state and a predicted vehicle dynamic computed from a requested operational state that navigated the vehicle to the current operational state. Separate observes may be provided, each dedicated to a particular lumped axle (e.g., one of the front tires and one for the rear tires). The states used in the observers, for a time horizon T, to estimate errors in the longitudinal dynamics of the vehicle may be provided as:

$$\zeta_x = \left[ \omega_{f/r} \Delta_{F_x, f/r} \right]^T \qquad \text{Eq. 13}$$

The error ($\Delta_{Fx}$) can be incorporated into the wheel speed dynamics for the tires as:

$$I_w \dot{\omega}_{f/r} = \left\{ \tau_{d,f/r} + \tau_{b,f/r} - r_{w,f/r} \left( F_{x,f/r} - \Delta_{F_{x,f/r}} \right) + n_{w,f/r} + \Delta_{m,f/r} \right\} \qquad \text{Eq. 14}$$

$$\dot{\Delta}_{F_{x,f/r}} = -\Delta_{F_{x,f/r}} \middle| /\tau_{F_x} + w_{F_{x,f/r}} \qquad \text{Eq. 15}$$

The observer estimates, denoted with a hat ($\hat{\ }$), can be given as:

$$I_w \dot{\hat{\omega}}_{f/r} \middle| = \left\{ \tau_{d,f/r} + \tau_{b,f/r} - r_{w,f/r} \left( \hat{F}_{x,f/r} - \hat{\Delta}_{F_{x,f/r}} \right) + l_{1,f/r} \left( \omega_{f/r}^m - \hat{\omega}_{f/r} \right) \right\} \qquad \text{Eq. 16}$$

$$\dot{\hat{\Delta}}_{F_{x,f/r}} = -\hat{\Delta}_{F_{x,f/r}} /\tau_{F_x} + l_{2,f/r} \left( \omega_{f/r}^m - \hat{\omega}_{f/r} \right) \qquad \text{Eq. 17}$$

where $\tau_d$ and $\tau_b$ represent measured drive torque and brake torque, respectively, applied at the wheel level at the time of acceleration and braking events, respectively; $r_w$ is the tire radius. $\Delta Fx$ can be modeled as a Markov-like process with a time-constant $\tau_{Fx}$. $n_w$ represents measurement noise and $\Delta_m$ represents the combined errors in mapping engine torque to $\tau_d$ and brake-cylinder pressure to $\tau_b$. $w_{Fx}$ is a bounded exogenous disturbance. $I_w$ is the tires' mass moment of inertia and $I_1$ and $I_2$ are observer gains.

In examples, the observer error dynamics may be stable dependent on $E_x$, which represents a vector of the errors defined above. For example, $E_x$ can be provided as:

$$E_x = \left[ n_w \ \Delta_m \ w_{F_x} \right]^T \qquad \text{Eq. 18}$$

The observer estimate error may be defined as:

$$\tilde{\zeta}_x = \zeta_x - \hat{\zeta}_x \qquad \text{Eq. 19}$$

Or $$\tilde{\zeta}_x = \left[ \tilde{\omega} \ \tilde{\Delta}_{F_x} \right]^T \qquad \text{Eq. 20}$$

Thus, the observer error dynamics can be obtained as:

$$I_w \dot{\tilde{\omega}} = -r_w \left( F_x - \hat{F}_x \right) + r_w \tilde{\Delta}_{F_x} - l_1 \tilde{\omega} + n_w + \Delta_m \qquad \text{Eq. 21}$$

$$\dot{\tilde{\Delta}}_{F_x} = -\tilde{\Delta}_{F_x} /\tau_{F_x} - l_2 \tilde{\omega} + w_{F_x} \qquad \text{Eq. 22}$$

The observer error dynamics provided by Eq. 21 and 22 may be uniformly globally exponentially stable when $E_x = 0$. Additionally, the observer error dynamics provided by Eq. 21 and 22 may be input-to-state stable for $$E_x \neq 0 \text{ if } \frac{l_1}{I_w} > \tau_{Fx} \frac{1}{4} \left( l_2 - \frac{r_w}{I_w} \right)^2.$$

For lateral component ($F_c$) observers, the errors in modeling the lateral vehicle dynamics may be defined as $\Delta_{vy}$ and $\Delta_r$. $\Delta_{vy}$ can be interpreted as a mass normalized error in the nominal model of $F_y$ of Eq. 8. $\Delta_r$ can be interpreted as a moment of inertia normalized error in the nominal model of $M_r$ of Eq. 9. The states used in the observer to estimate errors in the lateral dynamics of the vehicle can be provided as:

$$\zeta_y = \left[ v_y \ r \ \Delta_{vy} \ \Delta_r \right]^T \qquad \text{Eq. 23}$$

$\Delta_{vy}$ and $\Delta_r$ can be incorporated into the lateral dynamics of the vehicle as follows:

$$\dot{v}_y = -v_x^m r^m + F_y/m - \Delta_{vy} + n_{vy} \qquad \text{Eq. 24}$$

$$\dot{r} = M_r/I_z - \Delta_r + n_r \qquad \text{Eq. 25}$$

$$\dot{\Delta}_{vy} = -\Delta_{vy}/\tau_{vy} + w_{vy} \qquad \text{Eq. 26}$$

$$\dot{\Delta}_r = -\Delta_r/\tau_r + w_r \qquad \text{Eq. 27}$$

The observer estimates for the lateral dynamics can then be provided as:

$$\dot{\hat{v}}_y = -v_x^m r^m + \hat{F}_y/m - \hat{\Delta}_{vy} + k_{vy} \left( v_y^m - \hat{v}_y \right) \qquad \text{Eq. 28}$$

$$\dot{\hat{r}} = \hat{M}_r/I_z - \hat{\Delta}_r + k_r \left( r^m - \hat{r} \right) \qquad \text{Eq. 29}$$

$$\dot{\hat{\Delta}}_{vy} = -\hat{\Delta}_{vy}/\tau_{vy} - L_{vy} \left( ma_y^m - \hat{F}_y \right) \qquad \text{Eq. 30}$$

$$\dot{\hat{\Delta}}_r = -\hat{\Delta}_r/\tau_r - L_r \left( r^m - \hat{r} \right) \qquad \text{Eq. 31}$$

$\Delta_{vy}$ and $\Delta_r$ can be modeled as Markov-like processes with time-constants $\tau_{vy}$ and $\tau_r$, respectively. $n_{vy}$ and $n_r$ represent measurement noise while $w_{vy}$ and $w_r$ represent bounded exogenous disturbances. $k_{vy}$, $k_r$, $L_{vy}$ and $Lr$ are observer gains.

The observer estimation error can be defined as:

$$\tilde{\zeta}_y = \zeta_y - \hat{\zeta}_y \qquad \text{Eq. 32}$$

Or $$\tilde{\zeta}_y = \begin{bmatrix} \tilde{v}_y & \tilde{r} & \tilde{\Delta}_{vy} & \tilde{\Delta}_r \end{bmatrix}^T \qquad \text{Eq. 33}$$

The observer dynamics can be obtained as $$\dot{\tilde{v}}_y = (F_y - \hat{F}_y)/m - \tilde{\Delta}_{vy} - k_{vy}\tilde{v}_y + n_{vy} \qquad \text{Eq. 34}$$

$$\dot{\tilde{r}} = (M_r - \hat{M}_r)/I_z - \tilde{\Delta}_r - k_r\tilde{r} + n_r \qquad \text{Eq. 35}$$

$$\dot{\tilde{\Delta}}_{vy} = -\tilde{\Delta}_{vy}/\tau_{vy} + L_{vy}(F_y - \hat{F}_y) + e_{F_y} + w_{vy} \qquad \text{Eq. 36}$$

$$\dot{\tilde{\Delta}}_r = -\tilde{\Delta}_r/\tau_r + L_r(r^m - \hat{r}) + w_r \qquad \text{Eq. 37}$$

In examples, the observer error dynamics may be stable dependent on $E_y$, which represents a vector of the errors defined above. For example, $E_y$ can be provided as:

$$E_y = \begin{bmatrix} n_{vy} & n_r & e_{F_y} & \Delta_m & w_{vy} & w_r \end{bmatrix}^T \qquad \text{Eq. 38}$$

wherein error introduced ($e_{Fy}$) is due to approximating $ma_y^m$ as Fy.

The observer error dynamics provided by Eq. 34-37 may be uniformly globally exponentially stable when Ey=0. Additionally, the observer error dynamics provided by Eq. 21 and 22 may be input-to-state stable for Ey≠0 if:

1) $2(k_r - c_4)(k_{vy} + c_1) > 3(c_2 + c_3)^2$     Eq. 39

2) $(k_{vy} + c_1) > \tau_{vy}(1 - c_5 L_{vy})^2$

3) $4(k_r - c_4) > 3\tau_r(1 - L_r)^2$

4) $2(k_r - c_4) > 3\tau_{vy}(L_{vy}c_6)^2$

5) $k_r > c_4$.

The observers module 312 may be configured to translate the errors into correction terms for correcting the predicted tire forces (e.g., predicted longitudinal and lateral tire-road forces) of the combined model used by the controller module 308. For example, since the errors in predicting the nominal tire-road forces using Eq. 6 ultimately lead to errors in modeling the vehicle dynamics, the estimated errors $\hat{\Delta}_{Fx}$, $\hat{\Delta}_{vy}$ and $\hat{\Delta}_r$ can be translated into correction terms for the nominal tire-road forces as follows:

$$\Delta F_{c,f} = -\left\{ \frac{ml_r\hat{\Delta}_{vy} + I_z\hat{\Delta}_r}{(l_r + l_f)\cos\delta_f} \right\} \qquad \text{Eq. 40}$$

$$\Delta F_{c,r} = -\left\{ \frac{ml_r\hat{\Delta}_{vy} + I_z\hat{\Delta}_r}{(l_r + l_f)} \right\} \qquad \text{Eq. 41}$$

$$F_{c,f/r}^{corr} = \hat{F}_{c,f/r} + \Delta F_{c,f/r} \qquad \text{Eq. 42}$$

$$F_{x,f/r}^{corr} = \hat{F}_{x,f/r} + \hat{\Delta}F_{x,f/r} \qquad \text{Eq. 43}$$

Here, $\hat{F}_x$ and $\hat{F}_c$ are the longitudinal and lateral components of the tire-road forces obtained from the nominal tire-model in Eq. 6. $\Delta F_c$ is the correction term for the cornering force $F_c$ at a tire of the nominal bicycle model. $F_c^{corr}$ and $F_x^{corr}$ are the observer-corrected estimates of the ground-truth tire-road forces driving the vehicle.

Tracking the evolution of $F_{c,f/r}^{corr}$ and $F_{x,f/r}^{corr}$, and the resulting vehicle dynamics, can provide an opportunity for real-time anticipation of tire-road force saturation (e.g., anticipating vehicle's limits-of-handling). For example, $F_{c,f/r}^{corr}$ and $F_{x,f/r}^{corr}$ may be used to compute a corrected $F_{total}$ and corrected $F_z$, which ultimately can be used compute a critical slip $$(\sigma_{f/r}^{cr}).$$

In another example, the critical slip $$(\sigma_{f/r}^{cr})$$

may be computed directly from $F_{c,f/r}^{corr}$ and $F_{x,f/r}^{corr}$. In some examples, the combined slip ($\sigma_{f/r}$) can be also be computed from $F_{c,f/r}^{corr}$ and $F_{x,f/r}^{corr}$, for example, by inclusion in Eqs. 56 and/or 57 below. In this way, model errors can be observed and accounted for in safety-critical applications, for example, by estimating these errors and incorporating the errors into safety-critical constraints that respect the limits-of-handling, in real-time.

The CBF module 314 can be configured to filter nominal control commands (e.g., inputs) to be supplied to the vehicle systems 306 to constrain the vehicle to operation to within its limits-of-handling. In examples, the CBF module 314 can obtain a nominal control command (e.g., a requested control command) from the controller module 308. The CBF module 314 may also obtain requested operational states over a future time horizon that are predicted, by the controller module 308, to occur by effectuating the nominal control command. Each requested operational state may correspond to a set requested values for vehicle dynamics that effectuate the control command.

The CBF module 314 can obtain a safety-critical vehicle dynamic threshold that anticipates a safety-critical operational state at which the vehicle is predicted to breach a limits-of-handling for the current operational state. In an example, as will be detailed below, the safety-critical vehicle dynamic threshold may be provided as a critical slip computed by the CBF module 314 according to Eq. 2. The safety-critical vehicle dynamic threshold may be computed using vehicle dynamics as described above. In some examples, the vehicle dynamics may be corrected based on errors estimated by and translated into corrected vehicle dynamics by the observers module 312. For example, CBF module 314 may obtain corrected $F_z$, computed from $F_c^{corr}$ and $F_x^{corr}$, from the observer module 312, which can be used to calculate the critical slip $$(\sigma_{f/r}^{cr}).$$

The CBF module 314 may also use corrected forces to calculate the combined slip ($\sigma_{f/r}$), for example, by inclusion in Eqs. 56 and/or 57 below. However, in other examples, the vehicle dynamics may be uncorrected if desired.

In either case, the CBF module 314 may operate to filter the nominal control command based on the safety-critical vehicle dynamic threshold. For example, the CBF module 314 may determine that actually controlling the vehicle in the requested operational state, and requested vehicle dynamic condition, would result in operation of the vehicle in an unsafe driving state beyond its limits-of-handling. Accordingly, the CBF module 314 may trigger safety-critical control of the vehicle in a case where the requested vehicle dynamic condition exceeds safety-critical vehicle dynamic threshold. The safety-critical control can constrain the requested operational state by modifying the nominal control command to operate the vehicle in an safety-critical operational state in which the vehicle dynamic parameter does not exceed (e.g., is less than or equal to) the safety-critical vehicle dynamic threshold. Modifying the command may include adjusting the inputs by the CBF module 314 to constrain the vehicle dynamics according to the limits-of-handling. Adjusting the inputs can include increasing or decreasing the inputs with a maximum safety-critical value that the actual executed operations of the vehicle, when performing a maneuver, is not to exceed.

In examples, as alluded to above, the CBF module 314 may determine the safety-critical vehicle dynamic threshold by computing critical slip $$\left(\sigma_{f/r}^{cr}\right)$$

using Eq. 2. Critical slip $$\left(\sigma_{f/r}^{cr}\right)$$

may be separated into front critical slip $$\left(\sigma_f^{cr}\right)$$

and rear critical slip $$\left(\sigma_r^{cr}\right)$$

In this example, if $\sigma_f$ exceeds $$\sigma_f^{cr},$$

the front tire-road force saturates and, as a result, the vehicle understeers and achieves inadequate yaw rate. This lack of yawing may cause the vehicle to go off the road while executing a cornering maneuver. If $\sigma_r$ exceeds $$\sigma_r^{cr},$$

the rear tire-road force saturates and, as a result, the vehicle oversteers and experiences excessive yaw rate. This may cause the vehicle to spin out of control while executing a cornering maneuver. Therefore, in an understeering or over-steering vehicle, control, maneuvering and safety are compromised, especially in the presence of errors in modeling the vehicle dynamics. Accordingly, in the present example, CBF module 314 may be configured to constrain the nominal vehicle control, including requested operational states, to maintain $$\sigma_r \le \sigma_r^{cr}$$

and/or $$\sigma_f \le \sigma_f^{cr}.$$

This constraint may prevent saturation of tire-road forces, at the front and rear tires, despite the presence of modeling errors in the case where the observers module 312 provides corrected vehicle dynamics.

To achieve the above constraint, CBF module 314 may provide for a zeroing barrier function on wheel slip states. For example, CBF module 315 may define a zeroing barrier function (h) on $\sigma$ as $$h = \sigma^{cr} - \sigma \left(e.g., \ h_f = \sigma_f^{cr} - \sigma_f \ \text{and} \ h_r = \sigma_r^{cr} - \sigma_r\right).$$

Here, saturation of tire-road forces can be avoided by maintaining $h \ge 0$.

Safety-critical control at the limits-of-handling can be enforced by avoiding tire-road force saturation. This can be achieved through the following constraints at the front and rear tires, respectively:

$$\dot{h}_f \ge -\gamma_1(h_f) \qquad \qquad \text{Eq. 44}$$

$$\dot{h}_r \ge -\gamma_2(h_r) \qquad \qquad \text{Eq. 45}$$

where $\gamma_1$ and $\gamma_2$ are extended class K functions. Eq. 44 can be used to avoid understeer and Eq. 45 for oversteer. h can be turned into a control barrier function to constrain the nominal control commands of steering $\delta_f$, brake torque $\tau_b$, and drive torque $\tau_d$, as follows. Squaring, and differentiating Eq. 3 with respect to time can give:

$$\dot{\sigma} = \frac{\alpha}{\sigma}\dot{\alpha} + \frac{\kappa}{\sigma}\dot{\kappa} \qquad \qquad \text{Eq. 46}$$

For the constraints in Eq. 44 and 45, wheel slips $\alpha$ and $\kappa$ and vehicle sideslip $\beta$ can be defined as:

$$\alpha_f = -\delta_f + \arctan\left(\frac{v_y + l_f r}{v_x}\right) \approx -\delta_f + \beta + \frac{l_f r}{v_x} \qquad \text{Eq. 47}$$

$$\alpha_f = \arctan\left(\frac{v_y + l_f r}{v_x}\right) \approx \beta - \frac{l_f r}{v_x} \qquad \qquad \text{Eq. 48}$$

$$\kappa_f = \frac{\omega_f r_w - v_x}{v_x} \ \text{and} \ \kappa_r = \frac{\omega_r r_w - v_x}{v_x} \qquad \qquad \text{Eq. 49}$$

$$\beta = \arctan\left(\frac{v_y}{v_x}\right) \approx \frac{v_y}{v_x} \qquad \qquad \text{Eq. 51}$$

Therefore, for a given vehicle longitudinal speed $v_x$, using Eq. 2 and 5, Eq. 46 can be expanded for the front axle into:

$$\dot{\sigma}_f = \frac{\alpha_f}{\sigma_f}\left\{-\dot{\delta}_f + \dot{\beta} + \frac{l_f \dot{r}}{v_x}\right\} + \frac{\kappa_f}{\sigma_f}\frac{\dot{\omega}_f}{v_x}r_w \qquad \text{Eq. 51}$$

$$\dot{\sigma}_f^{cr} = \frac{3\mu_f}{C_f}d\dot{F}_{z,f} = \frac{3\mu_f k}{C_f}d\dot{F}_z - \left(\frac{h_{cg}}{l_f + l_r}\right)\dot{F}_{x,net} \qquad \text{Eq. 52}$$

For the rear axle, Eq. 36 can be expanded to:

$$\dot{\sigma}_r = \frac{\alpha_r}{\sigma_r}\left\{\dot{\beta} + \frac{l_f \dot{r}}{v_x}\right\} + \frac{\kappa_r}{\sigma_r}\left\{\frac{\dot{\omega}_r}{v_x}\right\}r_w \qquad \text{Eq. 53}$$

$$\dot{\sigma}_r^{cr} = \frac{3\mu_r}{C_r}d\dot{F}_{z,r} = -\frac{3\mu_r k}{C_r}d\dot{F}_z - \left(\frac{h_{cg}}{l_f + l_r}\right)\dot{F}_{x,net} \qquad \text{Eq. 54}$$

To provide for robust safety-critical constraints, in examples, a nominal dynamic bicycle model be represented by $(\dot{\omega}^n, \dot{r}^n, \dot{\beta}^n)$. In the presence modeling errors, the observer corrected vehicle dynamics are obtained from observers module 312 as:

$$\dot{\omega} = \dot{\omega}^n + \phi_{\dot{\omega}}(\hat{\Delta}_{Fx}) \qquad \text{Eq. 55}$$

$$\dot{r} = \dot{r}^n + \phi_{\dot{r}}(\hat{\Delta}_{v_y}, \hat{\Delta}_r)$$

$$\dot{\beta} = \dot{\beta}^n + \phi_{\dot{\beta}}(\hat{\Delta}_{v_y}, \hat{\Delta}_r)$$

Here, $(\phi_{\dot{\omega}}, \phi_{\dot{r}}, \phi_{\dot{\beta}})$ represent the error in the vehicle dynamics resulting from modeling errors and may solely be a function of the observer estimates $\hat{\Delta}_{Fx}$, $\hat{\Delta}_{v_y}$, and $\hat{\Delta}_r$. By incorporating Eq. 55 into Eq. 51 and 53, the dynamics of the barrier function $h_f$ can be robustified as follows:

$$h_f = -\dot{\sigma}_f + \dot{\sigma}_f^{cr} \qquad \text{Eq. 56}$$

$$= -\frac{\alpha_f}{\sigma_f}\left\{-\dot{\delta}_f + \dot{\beta}^n + \frac{l_f \dot{r}^n}{v_x}\right\} - \frac{\kappa_f}{\sigma_f}\left\{\frac{\dot{\omega}_f^n}{v_x}\right\}r_w + \dot{\sigma}_f^{cr}$$

$$- \left[\frac{\alpha_f}{\sigma_f}\left\{\phi_{\dot{\beta}} + \frac{l_f \phi_{\dot{r}}}{v_x}\right\} + \frac{\kappa_f}{\sigma_f}\left\{\frac{\phi_{\dot{\omega}_f}}{v_x}\right\}r_w\right]$$

$$= \dot{h}_f^n - \Phi_f.$$

Similarly, the dynamics of the barrier function $h_r$ can be robustified as follows:

$$\dot{h}_r = -\dot{\sigma}_r + \dot{\sigma}_r^{cr} \qquad \text{Eq. 57}$$

$$= -\frac{\alpha_r}{\sigma_r}\left\{\dot{\beta}^n - \frac{l_r \dot{r}^n}{v_x}\right\} - \frac{\kappa_r}{\sigma_r}\left\{\frac{\dot{\omega}_r^n}{v_x}\right\}r_w + \dot{\sigma}_r^{cr}$$

$$- \left[\frac{\alpha_r}{\sigma_r}\left\{\phi_{\dot{\beta}} - \frac{l_r \phi_{\dot{r}}}{v_x}\right\} + \frac{\kappa_r}{\sigma_r}\left\{\frac{\phi_{\dot{\omega}_r}}{v_x}\right\}r_w\right]$$

$$= \dot{h}_r^n - \Phi_r.$$

Here, $$\dot{h}_f^n \text{ and } \dot{h}_r^n$$

are the dynamics of the barrier functions obtained using the nominal vehicle dynamic model. Additionally:

$$\Phi_f = \left[\frac{\alpha_f}{\sigma_f}\left\{\phi_{\dot{\beta}} + \frac{l_f \phi_{\dot{r}}}{v_x}\right\} + \frac{\kappa_f}{\sigma_f}\left\{\frac{\phi_{\dot{\omega}_f}}{v_x}\right\}r_w\right] \qquad \text{Eq. 58}$$

$$\Phi_r = \left[\frac{\alpha_r}{\sigma_r}\left\{\phi_{\dot{\beta}} - \frac{l_f \phi_{\dot{r}}}{v_x}\right\} + \frac{\kappa_r}{\sigma_r}\left\{\frac{\phi_{\dot{\omega}_r}}{v_x}\right\}r_w\right] \qquad \text{Eq. 59}$$

Using Eqs. 58 and 59, safety-critical constraints in Eqs. 44 and 45 can be made robust as follows:

$$\dot{h}_f^n - \Phi_f \geq -\gamma_1(h_f) \qquad \text{Eq. 60}$$

$$\dot{h}_f^n - \Phi_f \geq -\gamma_2(h_r) \qquad \text{Eq. 61}$$

In examples, to prevent saturation of tire-road forces and maintain the vehicle dynamics within the limits-of-handling, the robust safety-critical constraints in Eqs. 60 and 61 are incorporated into a quadratic program (QP) formulation. For example, the QP formulation seeks to optimize a cost function provided as:

$$p^* = \operatorname*{argmin}_{p \in \mathcal{R}^s} \frac{1}{2}p^T Hp + g^T p \qquad \text{Eq. 62}$$

$$\text{s.t. } Ap \leq b \qquad \text{Eq. 63}$$

In this example, the array of QP variables to be optimized can be provided as:

$$p = [\,\delta_f \quad \tau_{d,r} \quad \tau_{b,f} \quad \tau_{b,r} \quad \gamma_f \quad \gamma_r \quad \zeta_f \quad \zeta_r\,]^T \qquad \text{Eq. 62}$$

Additionally:

$$H = \operatorname{diag}([\,w_{\delta_f} \quad w_{\tau_{d,r}} \quad w_{\tau_{b,f}} \quad w_{\tau_{b,r}} \quad 0 \quad 0 \quad w_{\zeta_f} \quad w_{\zeta_r}\,]^T) \qquad \text{Eq. 63}$$

$$g = [-\delta_f^n \quad -\tau_{d,r}^n \quad -\tau_{b,f}^n \quad -\tau_{b,r}^n \quad 0 \quad 0 \quad 0 \quad 0]^T \qquad \text{Eq. 64}$$

$$g = -[\,w_{\delta_f}\delta_f^n \quad w_{\tau_{d,r}}\tau_{d,r}^n \quad w_{\tau_{b,f}}\tau_{b,f}^n \quad w_{\tau_{b,r}}\tau_{b,r}^n \quad 0_{1\times 4}\,]^T$$

$$A = \begin{bmatrix} -\frac{\alpha_f}{\sigma_f \Delta t} & 0 & \Psi_f & 0 & -h_f & 0 & -1 & 0 \\ 0 & \Psi_r & 0 & \Psi_r & 0 & -h_r & 0 & -1 \\ 1 & 0 & 0 & 0 & 0 & 0 & 0 & 0 \\ -1 & 0 & 0 & 0 & 0 & 0 & 0 & 0 \\ 0 & 1 & 0 & 0 & 0 & 0 & 0 & 0 \\ 0 & -1 & 0 & 0 & 0 & 0 & 0 & 0 \\ 0 & 0 & 1 & 0 & 0 & 0 & 0 & 0 \\ 0 & 0 & -1 & 0 & 0 & 0 & 0 & 0 \\ 0 & 0 & 0 & 1 & 0 & 0 & 0 & 0 \\ 0 & 0 & 0 & -1 & 0 & 0 & 0 & 0 \end{bmatrix} \qquad \text{Eq. 65}$$

$$b = \begin{bmatrix} b_f \\ b_r \\ \delta_f^0 + \delta_f^{max}\Delta t \\ -\delta_f^0 + \delta_f^{max}\Delta t \\ \tau_{d,r}^0 + \tau_{d,r}^{max}\Delta t \\ b_b \end{bmatrix}, \quad b_b = \begin{bmatrix} -\tau_{d,r}^0 - \tau_{d,r}^{min}\Delta t \\ \tau_{b,f}^0 + \tau_{b,f}^{max}\Delta t \\ -\tau_{b,f}^0 + \tau_{b,f}^{max}\Delta t \\ \tau_{b,r}^0 + \tau_{b,r}^{max}\Delta t \\ -\tau_{b,r}^0 + \tau_{b,r}^{max}\Delta t \end{bmatrix} \qquad \text{Eq. 66}$$

Herein, the variables in Eq. 67-69, below, are used to define A and b in Eqs. 65 and 66 as follows:

$$\Psi_{f/r} = (\kappa_{f/r} r_w)/(\sigma_{f/r} I_w v_x) \qquad \text{Eq. 67}$$

$$b_f = \dot{\sigma}_f^{cr} - \Phi_f + \Psi_f r_w F_{x,f}^n - \frac{\alpha_f}{\alpha_f}\left\{\frac{\delta_f^0}{\Delta t} + \beta^n + \frac{l_f}{v_x} P^n\right\} \qquad \text{Eq. 68}$$

$$b_r = \dot{\sigma}_r^{cr} - \Phi_r + \Psi_r r_w F_{x,r}^n - \frac{\alpha_r}{\alpha_r}\left\{\beta^n + \frac{l_r}{v_x} P^n\right\} \qquad \text{Eq. 69}$$

The QP operates to filter a nominal control command from the controller module 308. The nominal control command for a rear-wheel vehicle may be provided as $u^n=$ $$\left[\delta_f^n, \ \tau_{d,r}^n, \ \tau_{b,f}^n, \ \tau_{b,r}^n\right]^T.$$

$\delta_f$ is the steering angle of the front tire; $\tau_{d,r}$ is the drive torque applied at the rear tire, $\tau_{b,r}$ is the brake torque applied at rear tire; and $\tau_{b,f}$ is the brake torque applied at the front tire. The filtered control command $u=[\delta_f, \tau_{d,r}, \tau_{b,f}, \tau_{b,r}]^T$ is constrained to maintain vehicle states within the limits-of-handling. For example, $\gamma_1(h_f)=\gamma_f h_f$ in Eq. 60 and, $\gamma_2(h_r)=\gamma_r h_r$ in Eq. 61, where $\gamma_f, \gamma_r \geq 0$ and are optimized within the QP (e.g., Eqs. 62 and 63). $\zeta_f$ and $\zeta_r$ in Eq. 62 are penalized relaxation variables added to maintain QP feasibility in the event the tire-road forces saturate and the vehicle dynamics have breached the limits-of-handling. This can occur if the vehicle crosses these limits faster than the brake, drive or steering actuators can react. H in Eq. 63 is the diagonal matrix of QP weights. The weights $w_{\delta f}, w_{\tau d,r}, w_{\tau b,f}$ and $w_{\tau b,r}$ penalize the deviation of $u^n$ from $u^*$. The weights $w_{\zeta f}$ and $w_{\zeta r}$ are weights penalizing $\zeta f$ and $\zeta r$, respectively. $\Delta t$ is the sampling interval. In Eq. 65 and 66, the superscript '0' represents the control effort applied by the actuator at a previous time-step. The maximum or the minimum slew rates of the controls u, in Eq. 66, are dictated by the vehicle actuators onboard. $F_{x,f/r}^n$ is the longitudinal tire-road force for the front and rear tires estimated by the nominal tire model in Eq. 6. In some examples, $F_{x,f/r}^n$ may be a corrected tire-road force based on errors observed by observers module 312, as described above.

FIG. 4 is a flow chart illustrating example operations for safety-critical control of a vehicle in accordance with various embodiments disclosed herein. FIG. 4 provides a process 400 that can be executed to filter requested operational states of a vehicle to constrain the vehicle to operation to within its limits-of-handling. Process 400 may be implemented as instructions, for example, stored on memory 208, that when executed by processor 206 perform one or more operations of process 400.

At operation 402, current operational states of a vehicle can be determined from sensor data collected by sensors on the vehicle. For example, sensors 252, systems 258, and/or sensors 304 may provide sensor data that can be used to resolve a current operational state of a vehicle (e.g., an actual, real-world operational state of the vehicle). The current operational state of the vehicle can be applied to a vehicle dynamic model to compute current vehicle dynamic parameters. In examples, the vehicle dynamic model may be a bicycle model combined with a slip tire model (e.g., a brush or Fiala tire model), which can be used to estimate vehicle dynamic parameters, such as tire dynamic parameters, from the current operational state, as described above in connection with Eqs. 1-12.

As described above in connection with FIG. 3, the vehicle dynamic parameter may include a tire dynamic parameter, as well as vehicle parameters, operational states, and other vehicle dynamic parameters. The tire dynamic parameter may include one or more of: combined slip, lateral wheel slip, longitudinal wheel slip, load on a tire, tire-road friction, lateral tire-road stiffness, steering angle. The vehicle parameter may include, among other states, one or more of: vehicle mass, vehicle yaw moment of inertia, acceleration due to gravity, distance between center of gravity of the vehicle and an axle; and distance between the center of gravity and a road surface. The vehicle dynamic parameter may also include one or more of: yaw moment of inertia, acceleration due to gravity, longitudinal velocity, lateral velocity, yaw velocity, wheel speed at an axle, longitudinal weight transfer state, engine torque, and front and rear brake torque.

At operation 404, a safety-critical threshold value of a vehicle dynamic parameter can be determined based on the current operational state obtained at operation 402. The safety-critical threshold value may correspond to a value for the vehicle dynamic parameter at which the vehicle is predicted to breach a limits-of-handling for the current operational state. In an illustrative example, the vehicle dynamic parameter may be a tire dynamic parameter, such as combined wheel slip. In this case, the safety-critical threshold value may be a critical wheel slip at which a tire of the vehicle is predicted to saturate.

In examples, the safety-critical threshold value can be computed based on one or more vehicle dynamic parameters determined from the current operational state. For example, estimates of vehicle dynamics for the current operational state can be computed by inputting the current operational state into the vehicle dynamic model. These estimates can be used to compute the safety-critical threshold value. For example, as described above in connection with FIG. 3, vehicle dynamics and vehicle parameters may be used to compute tire dynamic parameters, such as tire forces, for the current operational state, according to Eqs. 4-9. In some examples, the computed tire dynamic parameters, along with other current operational state information (e.g., tire-road friction and lateral tire-road stiffness) can be used to compute a critical slip value according to Eq. 2, as an example of a safety-critical threshold value.

In some examples, errors in vehicle dynamic model can be estimated, for example, by estimating errors in vehicle dynamics and relating these errors to ground-truth tire-road forces. For example, as detailed above in connection with FIG. 3, a vehicle dynamic estimated by applying the current operational state to a vehicle model can be compared to a vehicle dynamic predicted by applying a previously requested operational state (e.g., the requested operation state the navigate the vehicle to the current operational state) to the vehicle dynamic model. The difference between the estimated vehicle dynamic from the actual, real world operational state and the predicted vehicle dynamic may be indicative of the error in the vehicle dynamic model. The errors can be computed according to the Eqs. 13-43 described above. The errors can be translated into corrective vehicle dynamic parameters, which can be used to compute a safety-critical threshold value that is robust from model errors.

At operation 406, a command to operate the vehicle in a requested operational state is received. The command, which may be received as a control command signal, is generated, by a controller (e.g., autonomous control circuit 210 and/or controller module 308), based on driving inputs for operating the vehicle in the requested operational state. The driving inputs may be provided to track a desired or reference trajectory. The command may be received based on driver input, such as operation of a steering wheel, brake pedal, accelerator pedal, to request a desired drive torque, brake torque, steering angle, or combinations thereof for navigating the vehicle along a desired trajectory. In another example, an autonomous driving system may solve a vehicle control algorithm (e.g., an MPC algorithm) to compute desired drive torque, brake torque, steering angle, or combinations thereof to track a reference trajectory. In either case, the inputs can be used by a controller (e.g., autonomous control circuit 210 and/or controller module 308) to generate a nominal control command signal that can be supplied to vehicle systems (e.g., vehicles systems 258 and/or 306) for operating the vehicle according to requested driving inputs.

The requested operational state can be used to determine values for one or more requested vehicle dynamic parameters. For example, the requested operational state can be applied to the vehicle dynamic model (as described above in connection with Eqs. 1-12) to estimate values for one or more vehicle dynamic parameters. In examples, the estimated values may include values for one or more a tire dynamic parameter, such as tire forces and wheel slip. As described above in connection with FIG. 3, requested operational states can be used to compute a combined slip according to Eq. 3.

At operation 408, the command received at operation 406 can be filtered by constraining the requested operational state according to a CBF based on the safety-critical threshold value from operation 404 and the requested value of the dynamic parameter from operation 406. That is, as described above, a requested value for the dynamic parameter can be computed from the requested operational state. This requested value can be compared to safety-critical threshold value and trigger safety-critical control to ensure that the vehicle dynamic parameter does not exceed the safety-critical threshold value, upon an actual, real-world execution of the requested operational state, as described in connection with FIG. 3 and Eqs. 44-69. For example, a requested combined slip can be compared to a critical wheel slip and, if the requested combined slip exceeds the critical wheel slip, trigger safety-critical control to constrain the combined slip to not exceed the critical wheel slip.

At operation 410, a control signal can be generated that controls the vehicle according to the filtered command, for example, by modifying the driving inputs based on the constrained vehicle dynamic parameter. For example, as described in connection with FIG. 3 and Eqs. 44-69, the nominal control command received from the controller can be filtered by adjusting the driving inputs in a manner that ensures that the real-world value of the vehicle dynamic parameter, resulting from executing the command to navigate the vehicle, does not exceed the safety-critical threshold value. Such modifications may include, but not are not limited to, one or more of increasing or decreasing input drive torque, increasing or decreasing input brake torque, changing of input steering angle, or any combination thereof to ensure that, for example, a real-world wheel slip does not exceed the computed safety-critical wheel slip.

Figure 5:
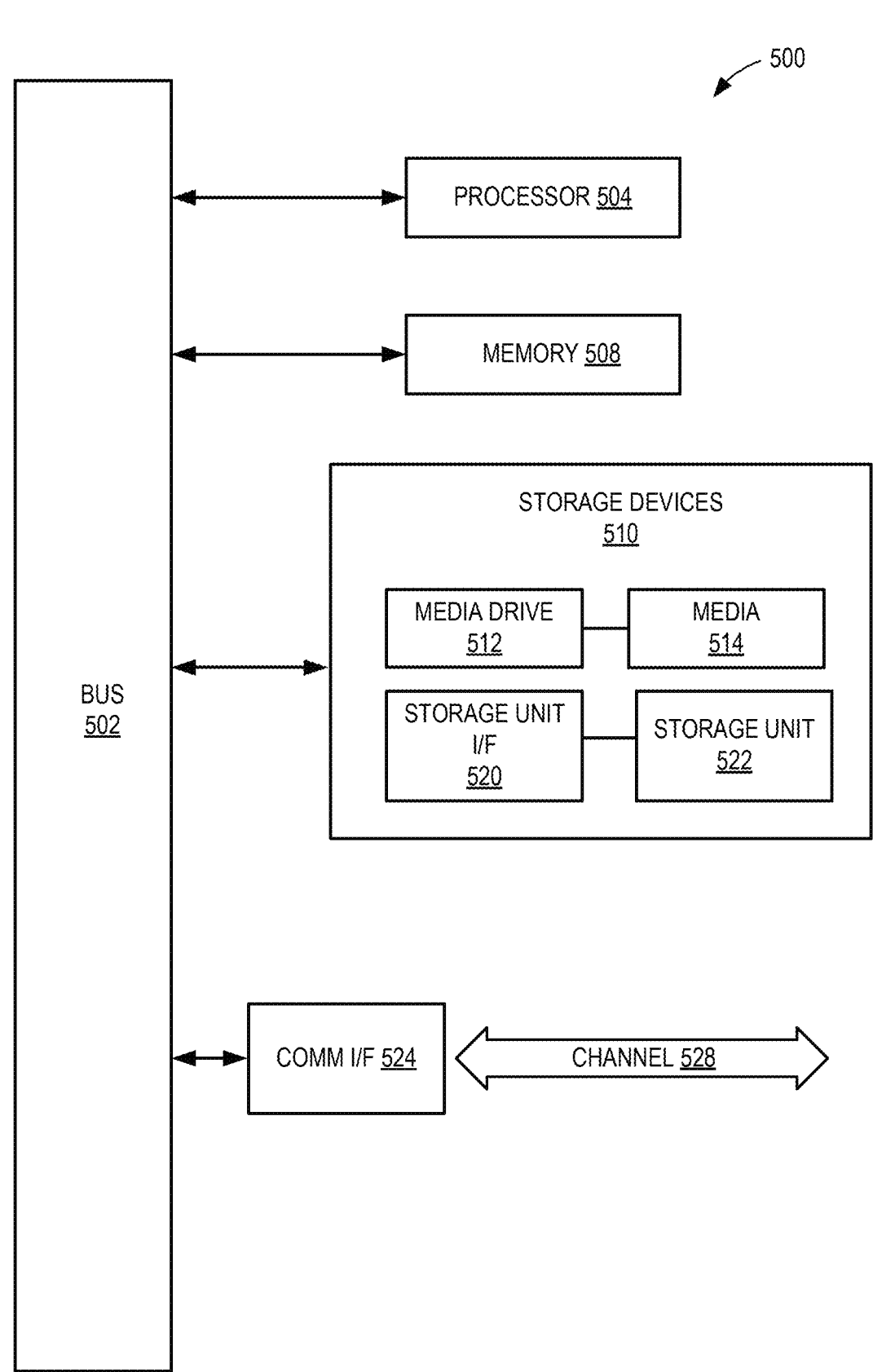
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up autonomous driving system 200 of FIG., components of FIG. 1, and/or the safety-critical control system 300 of FIG. 3. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Memory 508 may store instructions for executing the functions described in connection with FIG. 3, as well as instructions for executing the operations of process 400. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for controlling a vehicle, the method comprising:
    determining a current operational state of a vehicle based on sensor data collected by sensors on the vehicle;
    based on the current operational state, determining a safety-critical threshold value comprising a critical wheel slip threshold for a wheel slip vehicle dynamic parameter at which the vehicle is predicted to breach a limit-of-handling;

receiving a command to operate the vehicle in a requested operational state, the command comprising driving inputs for operating the vehicle in the requested operational state;

filtering the command by constraining the requested operational state according to a zeroing control barrier function based on wheel slip states and solved in a quadratic program based on the critical wheel slip threshold and a requested value of the wheel slip vehicle dynamic parameter determined from the requested operational state; and generating a control signal that controls the vehicle by modifying the driving inputs based on the filtered command.

2. The method of claim 1, further comprising:

estimating a tire dynamic parameter by applying the current operational state to a vehicle dynamic model, wherein the safety-critical threshold value further comprises the tire dynamic parameter.

3. The method of claim 2, wherein the vehicle dynamic model comprises a single-track dynamic bicycle model and a slip tire model.

4. The method of claim 2, wherein the tire dynamic parameter comprises one or more of: load on a tire, tire-road friction, lateral tire-road stiffness, steering angle.

5. The method of claim 2, wherein the safety-critical threshold value is based on at least one vehicle dynamic parameter, wherein the at least one vehicle dynamic comprises one or more of: yaw moment of inertia, acceleration due to gravity, longitudinal velocity, lateral velocity, yaw velocity, wheel speed at an axle, longitudinal weight transfer state, engine torque, and front and rear brake torque.

6. The method of claim 2, wherein the safety-critical threshold value is based on at least one vehicle parameter, wherein the at least one vehicle dynamic comprises one or more of: vehicle mass, vehicle yaw moment of inertia, acceleration due to gravity, distance between center of gravity of the vehicle and an axle; and distance between the center of gravity and a road surface.

7. The method of claim 2, further comprising:

estimating an error in the tire dynamic parameter based on a difference between the current operational state and a prior tire dynamic parameter estimated using the vehicle dynamic model; and translating the estimated error into a corrective tire dynamic parameter, wherein one or more of the safety-critical threshold value for the wheel slip vehicle dynamic parameter and the requested value of the wheel slip vehicle dynamic parameter is determined based on the corrective tire dynamic parameter.

8. The method of claim 1, wherein the wheel slip vehicle dynamic parameter is a tire dynamic parameter.

9. The method of claim 8, wherein determining the safety-critical threshold value for the wheel slip vehicle dynamic parameter comprises:

computing a load on a tire of the vehicle based on the current operational state applied to a vehicle dynamic model; and determining the safety-critical threshold value using the computed load on the tire.

10. The method of claim 9, wherein the safety-critical threshold value is a critical wheel slip at which a tire of the vehicle is predicted to saturate, and wherein the requested value of the wheel slip vehicle dynamic parameter is a requested combined wheel slip value.

11. The method of claim 1, further comprising:

predicting the requested value of the wheel slip vehicle dynamic parameter by applying the requested operational state to a vehicle dynamic model; and constraining the requested value of the wheel slip vehicle dynamic parameter based on the safety-critical threshold value such that the requested value does not exceed the safety-critical threshold value;

wherein modifying the driving inputs of the command is based on the constrained value.

12. The method of claim 1, wherein the driving inputs are received from one or more of an autonomous driving system and a driver operating the vehicle.

13. A vehicle control system, comprising:

a memory storing instructions;

a processor coupled to the memory and configured to execute the instructions to:

determine a current operational state of a vehicle based on sensor data collected by sensors on the vehicle;

based on the current operational state, determine a safety-critical threshold value comprising a critical wheel slip threshold for a wheel slip vehicle dynamic parameter at which the vehicle is predicted to breach a limits-of-handling;

receive a command to operate the vehicle in a requested operational state, the command comprising driving inputs for operating the vehicle in the requested operational state;

filter the command by constraining the requested operational state according to a zeroing control barrier function based on wheel slip states and solved in a quadratic program based on the critical wheel slip threshold and a requested value of the wheel slip vehicle dynamic parameter determined from the requested operational state; and generate a control signal that controls the vehicle by modifying the driving inputs based on the filtered command.

14. The vehicle control system of claim 13, wherein the processor is further configured to execute the instructions to:

estimate a tire dynamic parameter by applying the current operational state to a vehicle dynamic model, wherein the safety-critical threshold value further comprises the tire dynamic parameter.

15. The vehicle control system of claim 14, wherein the tire dynamic parameter comprises one or more of: load on a tire, tire-road friction, lateral tire-road stiffness, steering angle, and wherein the safety-critical threshold value is based on at least one vehicle dynamic parameter, wherein the at least one vehicle dynamic comprises one or more of: yaw moment of inertia, acceleration due to gravity, longitudinal velocity, lateral velocity, yaw velocity, wheel speed at an axle, longitudinal weight transfer state, engine torque, and front and rear brake torque.

16. The vehicle control system of claim 14, wherein the processor is further configured to execute the instructions to:

estimate an error in the tire dynamic parameter based on a difference between the current operational state and a prior tire dynamic parameter estimated using the vehicle dynamic model; and translate the estimated error into a corrective tire dynamic parameter, wherein one or more of the safety-critical threshold value for the wheel slip vehicle dynamic parameter and the requested value of the wheel slip vehicle dynamic parameter is determined based on the corrective tire dynamic parameter.

17. The vehicle control system of claim 13, further comprising:

predicting the requested value of the wheel slip vehicle dynamic parameter by applying the requested operational state to a vehicle dynamic model; and constraining the requested value of the wheel slip vehicle dynamic parameter based on the safety-critical threshold value such that the requested value does not exceed the safety-critical threshold value;

wherein modifying the driving inputs of the command is based on the constrained value.

18. The vehicle control system of claim 13, wherein the wheel slip vehicle dynamic parameter is a tire dynamic parameter, and wherein determining the safety-critical threshold value for the wheel slip vehicle dynamic parameter comprises:

computing a load on a tire of the vehicle based on the current operational state applied to a vehicle dynamic model; and determining the safety-critical threshold value using the computed load on the tire, wherein the safety-critical threshold value is a critical wheel slip at which a tire of the vehicle is predicted to saturate, and wherein the requested value of the wheel slip vehicle dynamic parameter is a requested combined wheel slip value.

19. A vehicle, comprising:

a processor; and a memory coupled to the processor to store instructions, which when executed by the processor, cause the processor to perform operations, the operations comprising:

determining a critical wheel slip threshold that anticipates a limits-of-handling of a vehicle based on first vehicle dynamics of the vehicle computed from a real-world operational state of the vehicle;

predicting a wheel slip value for a nominal control command by solving a vehicle control algorithm for second vehicle dynamics using a requested operational state for the vehicle based on the nominal control command that tracks a reference trajectory;

modifying the nominal control command by constraining the predicted wheel slip value to the critical wheel slip threshold; and operating the vehicle according to the modified control command.

20. The vehicle of claim 19, wherein the operations further comprise:

estimating a tire dynamic parameter by applying the real-world operational state to a vehicle dynamic model, wherein the critical wheel slip threshold value is determined based on the tire dynamic parameter.

* * * * *